US012159609B2

(12) United States Patent
Kishi et al.

(10) Patent No.: US 12,159,609 B2
(45) Date of Patent: Dec. 3, 2024

(54) INFORMATION PROCESSING DEVICE AND INFORMATION PROCESSING METHOD

(71) Applicant: SONY GROUP CORPORATION, Tokyo (JP)

(72) Inventors: Haruhiko Kishi, Tokyo (JP); Tomonobu Kikuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 621 days.

(21) Appl. No.: 17/310,436

(22) PCT Filed: Mar. 8, 2019

(86) PCT No.: PCT/JP2019/009353
§ 371 (c)(1),
(2) Date: Aug. 2, 2021

(87) PCT Pub. No.: WO2020/166094
PCT Pub. Date: Aug. 20, 2020

(65) Prior Publication Data

US 2022/0130359 A1 Apr. 28, 2022

Related U.S. Application Data

(60) Provisional application No. 62/804,450, filed on Feb. 12, 2019.

(51) Int. Cl.
*G10H 1/00* (2006.01)
*G10H 1/38* (2006.01)

(52) U.S. Cl.
CPC ......... *G10H 1/0025* (2013.01); *G10H 1/0066* (2013.01); *G10H 1/38* (2013.01); *G10H 2220/106* (2013.01)

(58) Field of Classification Search
CPC ...... G10H 1/0025; G10H 1/0066; G10H 1/38; G10H 2220/106
(Continued)

(56) References Cited

U.S. PATENT DOCUMENTS 8,779,268 B2 * 7/2014 Serletic ................ G10H 1/0025 84/613
9,110,817 B2 * 8/2015 Pachet .................... G06F 17/10
(Continued)

FOREIGN PATENT DOCUMENTS

CN 101167099 A 4/2008
CN 103503015 A 1/2014
(Continued)

OTHER PUBLICATIONS

"Briot et al., Music Generation by Deep Learning—Challenges and Directions, Sep. 30, 2018, XP081073413" (Year: 2018).*
(Continued)

*Primary Examiner* — Christina M Schreiber
(74) *Attorney, Agent, or Firm* — CHIP LAW GROUP

(57) ABSTRACT

An information processing device that controls a first application and a second application that functions as a plug-in that extends functions of the first application. The first application includes a control unit that controls operation of the second application in the first application, and the second application includes a selection unit that selects setting information for controlling a composition function based on machine learning, and a transmission/reception unit that transmits the setting information to an external server that executes a composition function based on machine learning and receives music data composed by the external server through a network.

20 Claims, 15 Drawing Sheets

(58) Field of Classification Search
USPC ............................................................ 84/609
See application file for complete search history.

(56) References Cited

U.S. PATENT DOCUMENTS

| | | | | |
|---|---|---|---|---|
| 2005/0025320 | A1* | 2/2005 | Barry | G11B 27/034 381/119 |
| 2007/0044639 | A1* | 3/2007 | Farbood | G10H 1/0025 84/609 |
| 2009/0071315 | A1* | 3/2009 | Fortuna | G10H 1/0025 84/609 |
| 2009/0125799 | A1* | 5/2009 | Kirby | H04N 1/00464 715/234 |
| 2010/0031804 | A1* | 2/2010 | Chevreau | G10H 1/365 84/609 |
| 2012/0072841 | A1* | 3/2012 | Moricca | G06Q 10/10 715/716 |
| 2012/0297958 | A1* | 11/2012 | Rassool | G10H 1/0025 84/609 |
| 2014/0000440 | A1* | 1/2014 | Georges | G10H 7/00 84/609 |
| 2014/0053710 | A1* | 2/2014 | Serletic, II | G06F 3/0481 84/609 |
| 2018/0190250 | A1* | 7/2018 | Hiskey | G10H 1/46 |
| 2018/0374461 | A1* | 12/2018 | Serletic | H04N 9/8211 |
| 2020/0168197 | A1* | 5/2020 | Silverstein | G06N 7/01 |
| 2020/0257723 | A1* | 8/2020 | Kano | G06F 16/64 |
| 2022/0130359 | A1* | 4/2022 | Kishi | G10H 1/0025 |
| 2022/0230104 | A1* | 7/2022 | Kishi | G10H 1/0025 |
| 2022/0262328 | A1* | 8/2022 | Lerman | G10H 1/368 |
| 2022/0406280 | A1* | 12/2022 | Kishi | G10G 1/00 |
| 2022/0406283 | A1* | 12/2022 | Kishi | G10H 1/0025 |
| 2023/0298547 | A1* | 9/2023 | Kishi | G06Q 30/015 84/602 |

FOREIGN PATENT DOCUMENTS

| | | | | |
|---|---|---|---|---|
| JP | 2002169570 | A | | 6/2002 |
| JP | 2005266320 | A | | 9/2005 |
| JP | 2008541149 | A | | 11/2008 |
| JP | 2010165160 | A | | 7/2010 |
| JP | 2017219699 | A | | 12/2017 |
| KR | 10-2018-0070340 | A | | 6/2018 |
| KR | 20180070340 | A | * | 6/2018 |

OTHER PUBLICATIONS

Briot, et al., "Music Generation by Deep Learning—Challenges and Directions", Machine Learning, Audio and Speech Processing, XP081073413, Sep. 30, 2018, 17 pages.
Sylvain, et al., "The Smuse: An Embodied Cognition Approach To Interactive Music Composition", International Computer Music Association, XP055900470, 2012, pp. 365-372.
Briot, et al., "Deep Learning Techniques for Music Generation—A Survey", Machine Learning, XP081037564, Aug. 7, 2019, 189 pages.
Extended European Search Report of EP Application No. 19914808.1, issued on Mar. 23, 2022, 16 pages.
Briot, et al., "Music Generation by Deep Learning—Challenges and Directions", Neural Computing & Applications, Springer Nature, Sep. 30, 2018, 17 pages.
International Search Report and Written Opinion of PCT Application No. PCT/JP2019/009353, issued on May 21, 2019, 08 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/009353 filed on Mar. 8, 2019, which claims priority benefit of Japanese Patent Application No. US 62/804,450 filed in the United States Patent Office on Feb. 12, 2019. Each of the above-referenced applications is hereby incorporated herein by reference in its entirety.

TECHNICAL FIELD

The present disclosure relates to an information processing device, an information processing method, and an information processing program. Specifically, the present disclosure relates to use of music data composed on the basis of machine learning.

BACKGROUND ART

With the progress of artificial intelligence (AI), the use of computers in the art field is being promoted.

For example, there is known a technology of performing machine learning using existing music as learning data to generate a learning model for music generation, and having a computer compose new music (e.g., Patent Document 1). In such a technology, it is possible to imitate the features of existing music or generate a more natural melody by using a Markov model.

CITATION LIST

Patent Document

Patent Document 1: U.S. Pat. No. 9,110,817

SUMMARY OF THE INVENTION

Problems to be Solved by the Invention

According to the conventional technology, since music data proposed (generated) by AI can be used for composition, the user can compose music on the basis of a wider variety of viewpoints.

However, with the conventional technology described above, it is not always possible to improve convenience of the automatic composition function by AI. For example, at present, many users use a digital audio workstation (DAW) to compose, arrange, and record. However, when the user uses the conventional technology described above in combination with a DAW, the work is carried out while going back and forth between different work environments, which may reduce the work efficiency. Additionally, since the automatic composition function by AI generally has a heavy information processing load, if the automatic composition function is executed at the same time as the DAW in the terminal device, there is a possibility that sufficient functions are not exhibited or processing on the DAW side is delayed.

Against this background, the present disclosure proposes an information processing device, an information processing method, and an information processing program that can improve convenience of an automatic composition function by AI.

Solutions to Problems

In order to solve the above problems, an information processing device of one form according to the present disclosure is an information processing device that controls a first application and a second application that functions as a plug-in that extends functions of the first application, in which the first application includes a control unit that controls operation of the second application in the first application, and the second application includes a selection unit that selects setting information for controlling a composition function based on machine learning, and a transmission/reception unit that transmits the setting information to an external server that executes a composition function based on machine learning and receives music data composed by the external server through a network.

MODE FOR CARRYING OUT THE INVENTION

Figure 1:
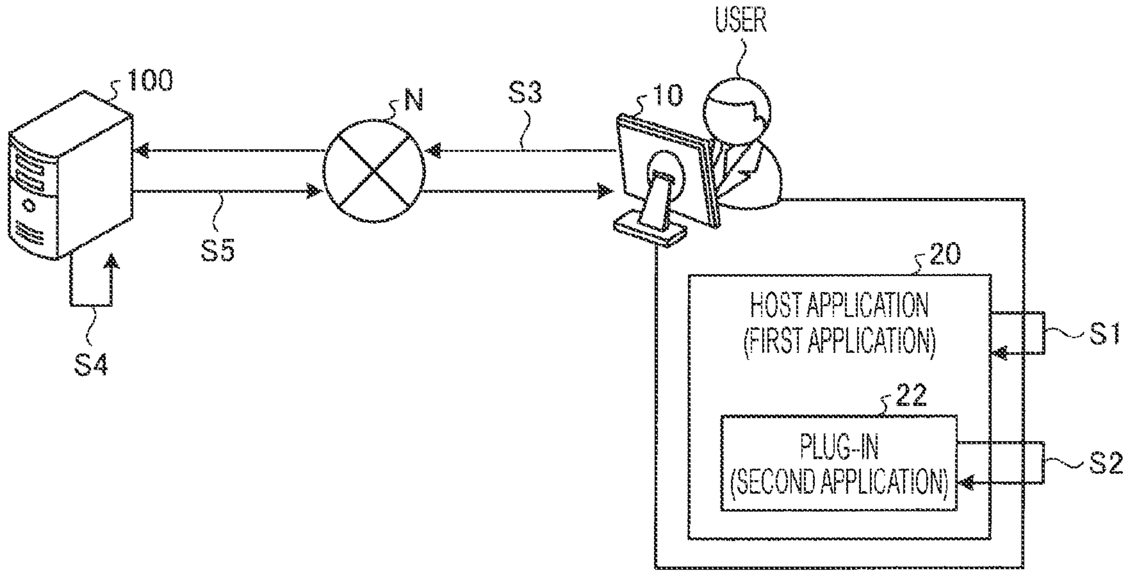
FIG. 1 is a conceptual diagram showing the flow of information processing according to an embodiment.

Hereinafter, embodiments of the present disclosure will be described in detail with reference to the drawings. Note that in each of the following embodiments, the same parts will be designated by the same reference numerals, thereby omitting duplicate description.

The present disclosure will be described according to the order of items shown below.

1. Embodiment
1-1. One example of information processing according to embodiment
1-2. Configuration of information processing system according to embodiment
1-3. Configuration of information processing device (user terminal) according to embodiment
1-4. Configuration of the external server (processing server) according to embodiment
1-5. Procedure of information processing according to embodiment
2. Modification
2-1. Form of music data
2-2. Host application
2-3. Control by DAW
2-4. Mode of information processing system
3. Other embodiments
4. Effect of information processing device according to the present disclosure
5. Hardware configuration

1. Embodiment

1-1. One Example of Information Processing According to Embodiment

First, one example of information processing according to the present disclosure will be described with reference to FIG. 1. FIG. 1 is a conceptual diagram showing the flow of information processing according to an embodiment. The information processing according to the embodiment is performed by a user terminal 10 which is one example of an information processing device according to the present disclosure, and a processing server 100 which is one example of an external server according to the present disclosure. The user terminal 10 and the processing server 100 communicate with each other using a wired or wireless network N (e.g., the Internet or the like) shown in FIG. 1. Note that the number of user terminals 10 and processing servers 100 is not limited to that shown in FIG. 1.

The user terminal 10 shown in FIG. 1 is one example of the information processing device according to the present disclosure. For example, the user terminal 10 is an information processing terminal such as a personal computer (PC), a tablet terminal, or a smartphone. Various program applications (hereinafter simply referred to as "applications") are included (installed) in the user terminal 10. The user terminal 10 starts and executes various applications and performs various information processing.

In the embodiment, the user terminal 10 includes an application (so-called DAW) that implements a comprehensive music production environment. In the following description, the application (DAW) is referred to as a first application or a host application. Another application for extending functions can be incorporated (inserted) into the first application according to the embodiment. That is, it is assumed that the first application can use a so-called plug-in, which is another application for extending functions. In this case, the first application functions as the host application for the incorporated plug-in.

Additionally, in the embodiment, the user terminal 10 includes an application having an automatic composition function by AI. In the following description, the application (application having automatic composition function by AI) is referred to as a second application or a plug-in. The second application according to the embodiment is incorporated as a plug-in of the first application described above. The plug-in can take the form of, for example, Steinberg's virtual studio technology (VST) (registered trademark), Audio Units, Avid Audio eXtension (AAX), and the like.

The processing server 100 shown in FIG. 1 is a server device that performs information processing related to the second application included in the user terminal 10. For example, the processing server 100 is a so-called cloud server, and performs predetermined information processing on the basis of information commanded by the user terminal 10 through the network N. Specifically, the processing server 100 performs predetermined learning processing on the basis of information transmitted from the user terminal 10, and generates music data on the basis of data output from a learned model. In other words, the processing server 100 executes the automatic composition function by AI on the basis of a command of the user terminal 10. For example, the processing server 100 provides the user terminal 10 with music data automatically composed using a Markov model or the like, as shown in the above-mentioned conventional technology document or the like.

As described above, by using the second application as a plug-in, the user terminal 10 can drag and drop the music data provided by the processing server 100 on the second application onto the first application, or perform editing on the first application. Additionally, while the automatic composition function has been dependent on the processing performance (CPU power and the like) of the terminal on which the processing is performed in the conventional technology, as shown in FIG. 1, the user terminal 10 does not perform learning processing by itself, but causes the processing server 100 to perform the processing. As a result, the user terminal 10 can execute the automatic composition function, which has a relatively high processing load, while saving its own resources. Hence, the user terminal 10 can solve the DAW processing delay (occurrence of latency and the like), which has been a conventional problem. Consequently, the user terminal 10 according to the present disclosure can improve convenience of the automatic composition function by AI. Hereinafter, the outline of the information processing according to the present disclosure will be described according to the flow with reference to FIG. 1.

As shown in FIG. 1, the user terminal 10 activates the host application (first application) 20 (step S1). Additionally, the user terminal 10 activates the plug-in (second application) 22 as one example of the plug-in that operates on the host application 20 (step S2).

The user terminal 10 selects the setting information of music to be automatically composed in the plug-in 22 according to the user's operation. Although details will be described later, the user terminal 10 selects setting information such as chord progression of the music to be automatically composed, a subjective image of the music (dark, bright, and the like), and the composition of the music according to operations of the user. Then, the user terminal 10 transmits the selected setting information to the processing server 100 (step S3).

The processing server 100 performs predetermined learning processing on the basis of the setting information transmitted from the user terminal 10, and performs composition processing on the basis of the learning result (step S4). For such composition processing, the processing described in the conventional technology document described above may be used, for example. Then, the processing server 100 generates the composed music data.

Subsequently, the processing server 100 transmits the generated music data to the user terminal 10 (step S5). The user terminal 10 receives the music data transmitted from the processing server 100 in the plug-in 22. For example, the music data includes information such as chord progression, a melody, and bass note progression generated by the processing server 100. Note that the music data may be standard data such as musical instrument digital interface (MIDI) data, waveform data, or DAW original standard data. The user may edit the received music data on the plug-in 22, or may copy the music data to the host application 20 and use it on the host application 20.

As described above, the user terminal 10 controls the host application 20 and the plug-in 22 that functions as a plug-in that extends the functions of the host application 20. Additionally, the host application 20 controls the operation of the plug-in 22 in the host application 20. Additionally, the plug-in 22 selects the setting information for controlling the composition function based on machine learning, transmits the setting information to the processing server 100 through the network N, and receives the music data composed by the processing server 100.

That is, the user terminal 10 uses the automatic composition function as a plug-in of the DAW. For this reason, the user can receive the support of the automatic composition function in the DAW which is a normal working environment. Additionally, the user can avoid the delay of processing in the DAW by making the processing server 100 bear the processing load of the automatic composition function. Consequently, the user terminal 10 can improve convenience of the automatic composition function by AI.

Next, the details of the automatic composition function by the plug-in 22 will be described with reference to FIGS. 2 to 4.

Figure 2:
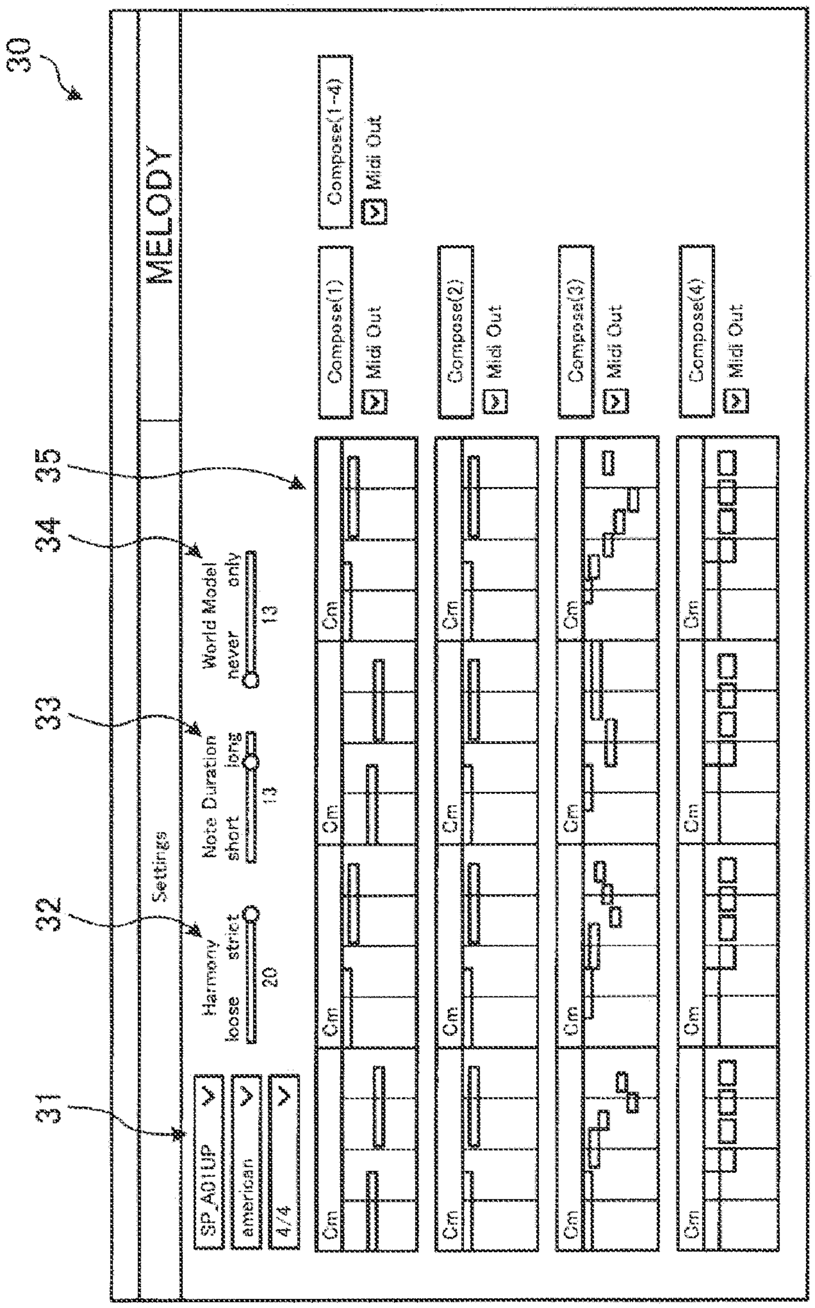
FIG. 2 is a diagram (1) showing one example of a user interface according to the embodiment.

FIG. 2 is a diagram (1) showing one example of a user interface according to the embodiment. FIG. 2 shows one example of the user interface when the plug-in 22 is displayed on a screen of the user terminal 10.

In the example shown in FIG. 2, a user interface 30 displays music data received by the plug-in 22. Note that although details will be described later, music data in the plug-in 22 includes three different types of data: melody, chord, and bass note. Of the three different types of data, the user interface 30 shown in FIG. 2 displays data related to melody.

Setting information 31 displays information regarding the style palette, which is one example of setting information in the automatic composition function. The style palette is designation information for designating material music to be learning data for machine learning.

Setting information 32 displays information regarding harmony, which is one example of setting information in the automatic composition function. The information regarding harmony is, for example, information for determining the probability that constituent notes included in a chord appear in the melody of the music data composed by the processing server 100. For example, if the user sets the information regarding harmony to "strict", constituent notes included in a chord are more likely to appear in the melody of the automatically composed music data. On the other hand, if the user sets the information regarding harmony to "loose", constituent notes included in a chord are less likely to appear in the melody of the automatically composed music data. The example in FIG. 2 shows that the user has applied the information regarding harmony closer to "strict".

Setting information 33 displays note length information, which is one example of setting information in the automatic composition function. The note length information is, for example, information for determining the note length in the music data composed by the processing server 100. For example, if the user sets the note length information to "long", notes with a relatively long note length (e.g., whole note, half note, and the like) are more likely to appear in the automatically composed music data. On the other hand, if the user sets the note length information to "short", notes with a relatively short note length (e.g., eighth note, sixteenth note, and the like) are more likely to appear in the automatically composed music data.

Setting information 34 displays information for determining the type and amount of material music other than the material music included in the designation information (style palette designated by user), which is one example of setting information in the automatic composition function. Such information is, for example, information for determining whether or not to perform learning strictly on the basis of the music included in the style palette designated by the user in the music data composed by the processing server 100. For example, if the user sets such information to "never", the tendency to use music other than the music included in the style palette in automatic composition learning decreases. On the other hand, if the user sets such information to "only", the tendency to use music other than the music included in the style palette in automatic composition learning increases.

Music data 35 displays specific music data transmitted from the processing server 100. In the example of FIG. 2, the music data 35 includes information indicating progression of a chord such as Cm, information indicating a pitch and a note length in a bar, transition of the note pitch (in other words, melody), and the like. Additionally, as shown in FIG. 2, the music data 35 may include four different types of contents, for example. That is, the processing server 100 may transmit multiple pieces of music data, instead of transmitting only one type of automatically composed music data. As a result, the user can select music data of his/her liking from the generated multiple music data candidates, or combine the multiple pieces of music data to compose music of his/her liking.

Note that while the user interface 30 shown in FIG. 2 displays data related to melody among the three different types of data: melody, chord, and bass note included in the music data, other data are displayed on other user interfaces. This point will be described with reference to FIG. 3. FIG. 3 is a diagram (2) showing one example of the user interface according to the embodiment.

Figure 3:
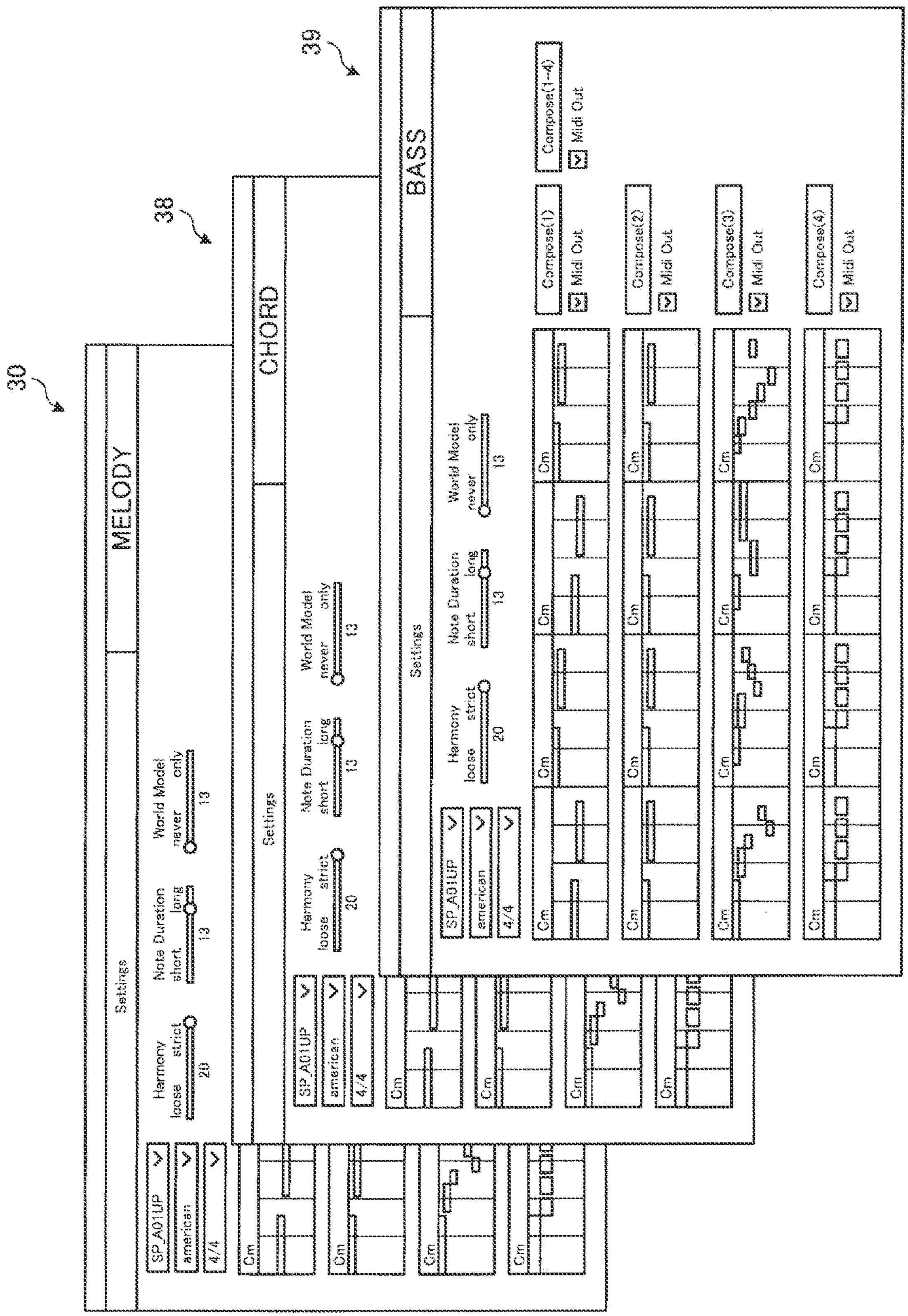
FIG. 3 is a diagram (2) showing one example of the user interface according to the embodiment.

As shown in FIG. 3, in addition to the user interface 30 that displays data related to melody, the user terminal 10 may display a user interface 38 that displays data related to chords and a user interface 39 that displays data related to bass notes on the screen. Although not shown in FIG. 3, the user interface 38 and the user interface 39 display note information different from the music data 35 in the user interface 30. Specifically, the user interface 38 displays note information (e.g., constituent notes and the like of chord Cm) related to chords corresponding to the melody of the music data. Additionally, the user interface 39 displays note information (e.g., note "C" in the case of chord Cm, and the like) related to the bass note corresponding to the melody or chord of the music data.

The user can select the information to be copied to the host application 20 from the displayed user interface 30, user interface 38, and user interface 39, or edit a part of the bass note, for example.

Next, the style palette, which is one example of the setting information described above, will be described with reference to FIG. 4. FIG. 4 is a diagram showing one example of the style palette according to the embodiment.

Figure 4:
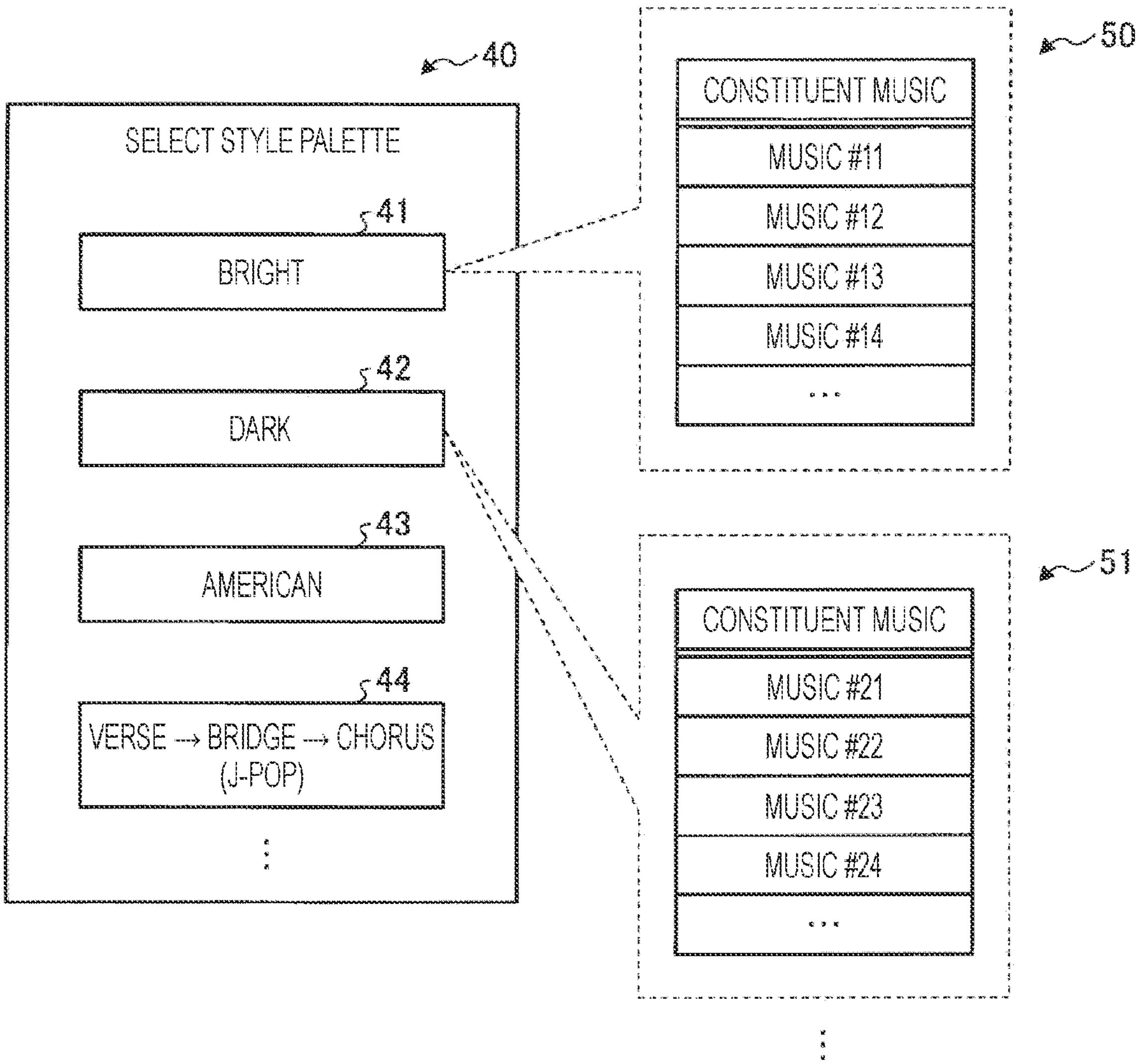
FIG. 4 is a diagram showing one example of a style palette according to the embodiment.

A window 40 shown in FIG. 4 is one example of a user interface displayed in the plug-in 22. For example, the user refers to feature information of style palettes displayed in the window 40 and selects an image that matches the music to be automatically composed. For example, the user selects a style palette 41 having the feature information "bright", a style palette 42 having the feature information "dark", or the like. Alternatively, the user selects a style palette 43 named "American" having the genre and type of the music as feature information, or a style palette 44 named "verse→bridge→chorus" having the composition of the music as feature information.

Note that as described above, the style palette is information for designating the music used by the processing server 100 for learning. That is, each style palette contains information for identifying an existing piece of music composed in advance. For example, it is assumed that a constituent music list 50 is associated with the style palette 41. The constituent music list 50 includes multiple pieces of existing music. Additionally, it is assumed that a constituent music list 51 is associated with the style palette 42. The constituent music list 51 includes multiple pieces of existing music different from the music included in the constituent music list 50.

For this reason, a learning model generated by machine learning on the basis of the style palette 41 is different from a learning model generated by machine learning on the basis of the style palette 42. This is because the learning data in machine learning changes depending on the style palette selected by the user. That is, the style palette can also be considered as designation information for designating learning data in automatic composition.

The music included in the style palette is, for example, pre-registered by the administrator, provider, or the like of the plug-in 22. For example, the administrator of the plug-in 22 extracts multiple pieces of music that are subjectively perceived as "bright" to generate the constituent music list 50, and associates the constituent music list 50 with the style palette 41. Note that the style palette and the music corresponding to the style palette may be arbitrarily edited by the user of the plug-in 22. For example, the user may select music from a web service such as a song distribution service or a social networking service (SNS), combine the selected pieces of music, and generate a desired style palette. Specifically, the user may arbitrarily extract music included in a playlist automatically generated by a predetermined music application or a playlist provided to the user of the music application, and change the constituent music of a style palette that he/she created or create a new style palette. As a result, the user can flexibly generate a style palette of his/her liking.

Note that the user may select multiple style palettes when selecting the style palette as setting information. For example, the user may select the style palette 41 as the setting information for composing a part of a song (e.g., first eight bars), and select the style palette 42 as the setting information for composing another part of the song (e.g., middle eight bars). Such information including multiple style palettes is hereinafter referred to as a style palette sequence. In other words, the style palette sequence can be considered as combined designation information in which pieces of designation information for designating music, that is, style palettes are combined. The user can easily create various music data having multiple features in a single piece of music by setting the style palette sequence for the music composition.

Figure 5:
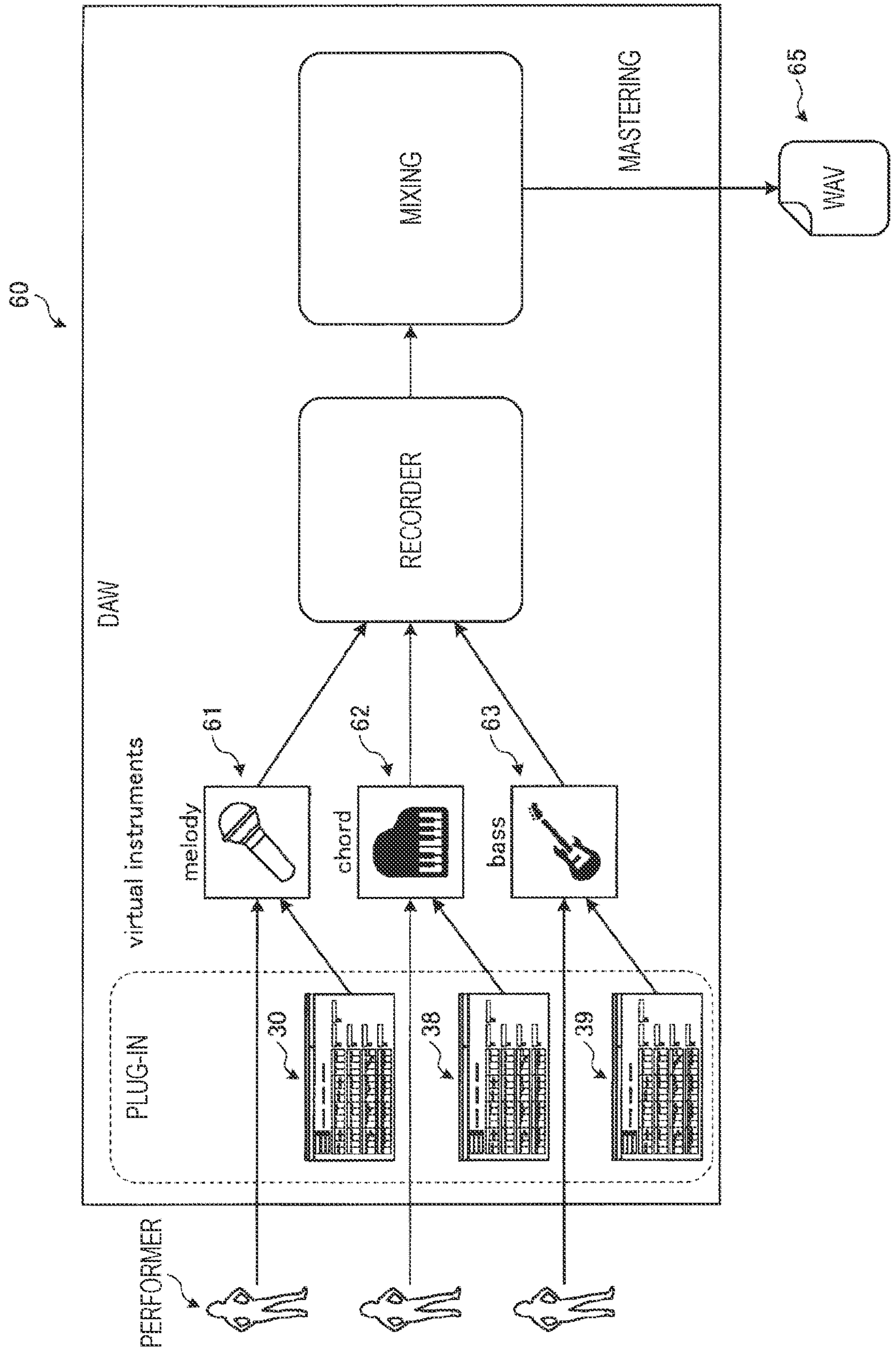
FIG. 5 is a block diagram showing the flow of information processing according to the embodiment.

Next, the relationship between the host application 20 and the plug-in 22 will be conceptually shown with reference to FIG. 5. FIG. 5 is a block diagram showing the flow of information processing according to the embodiment.

A processing block 60 shown in FIG. 5 shows the flow of processing performed by the DAW (host application 20) and the plug-in 22. Normally, a performer records the sound of playing an instrument or creates data such as MIDI. Additionally, in the information processing according to the embodiment, music data corresponding to the melody, chord, and bass note is generated by the plug-in 22 instead of the performer. For example, the performer or the plug-in 22 generates a melody 61, a chord 62, or a bass note 63.

Thereafter, the user records the melody 61, the chord 62, and the bass note 63 used for the music in the recorder related to the DAW, and creates each track corresponding to the melody, the chord, and the bass note. For example, the user sets instrument information indicating the instrument to be used in the performance for the melody 61 generated by the plug-in 22. Specifically, the user sets instrument information such as playing the melody 61 on a guitar registered in the DAW. Then, the user records the sound played by the virtual guitar in the recorder and creates a track corresponding to the guitar. Note that since the DAW can create multiple tracks, a track based on the performance sound of the performer and a track based on the music data created by the plug-in 22 may coexist.

Thereafter, the user mixes the tracks on the DAW and creates music data by performing a mixdown and the like. Additionally, the user performs mastering on the DAW, adjusts the acoustic signal level and the like, and creates a music file 65 that can be played back on a playback device or the like.

As described above, according to the information processing according to the embodiment, the user can use data automatically composed by the plug-in 22 according to the performance data played by the performer and the created MIDI data, and create music on the DAW. For example, the user can create music on the DAW by mixing a melody automatically composed by AI with the performance data played by the performer, or by incorporating a chord progression proposed by AI into the performance data played by the performer.

Figure 6:
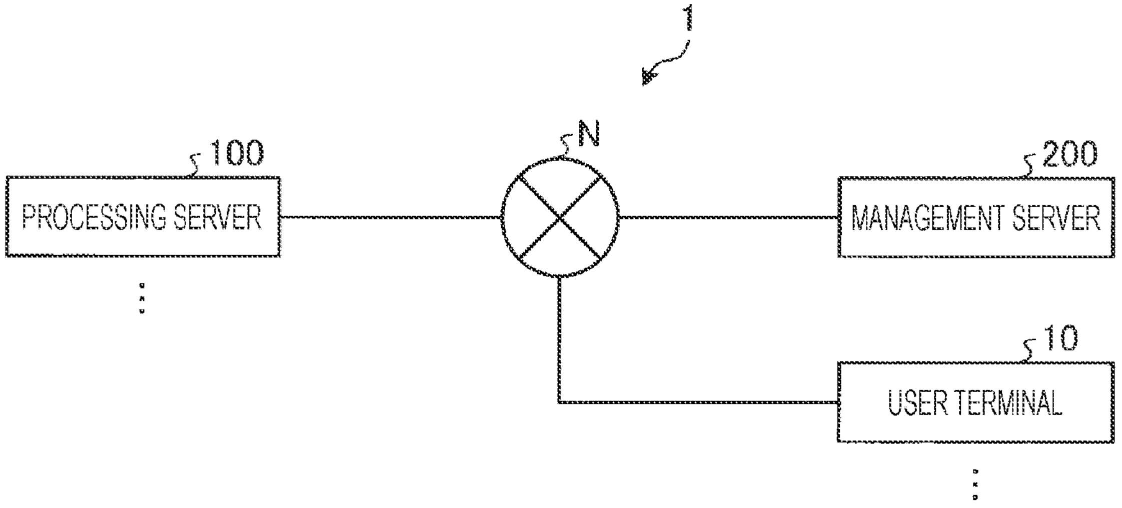
FIG. 6 is a diagram showing an information processing system according to the embodiment of the present disclosure.

Hereinabove, the outline of the overall flow of the information processing according to the present disclosure has been described. In FIG. 6 and the following drawings, the configuration of an information processing system 1 including the user terminal 10 will be described, and the details of various processing will be described in order.

1-2. Configuration of Information Processing System According to First Embodiment FIG. 6 is a diagram showing one example of the information processing system 1 according to a first embodiment of the present disclosure. As shown in FIG. 1, the information processing system 1 includes a user terminal 10, a processing server 100, and a management server 200.

The user terminal 10 is one example of the information processing device according to the present disclosure, and controls the operation of the host application 20 and the plug-in 22.

The processing server 100 is one example of an external server according to the present disclosure, and performs automatic composition processing in cooperation with the plug-in 22.

The management server 200 is, for example, a server managed by a business operator or the like that provides the plug-in 22.

For example, the management server 200 manages the user authority of the user of the plug-in 22, and manages information of the style palette available in the plug-in 22. For example, the management server 200 determines whether or not a user has the authority to use the plug-in 22 on the basis of a user ID that uniquely identifies the user. Additionally, the management server 200 creates a style palette, edits music included in the style palette, and transmits information regarding the style palette to the user terminal 10 and the processing server 100. Note that the management server 200 may be integrally configured with the processing server 100.

Figure 7:
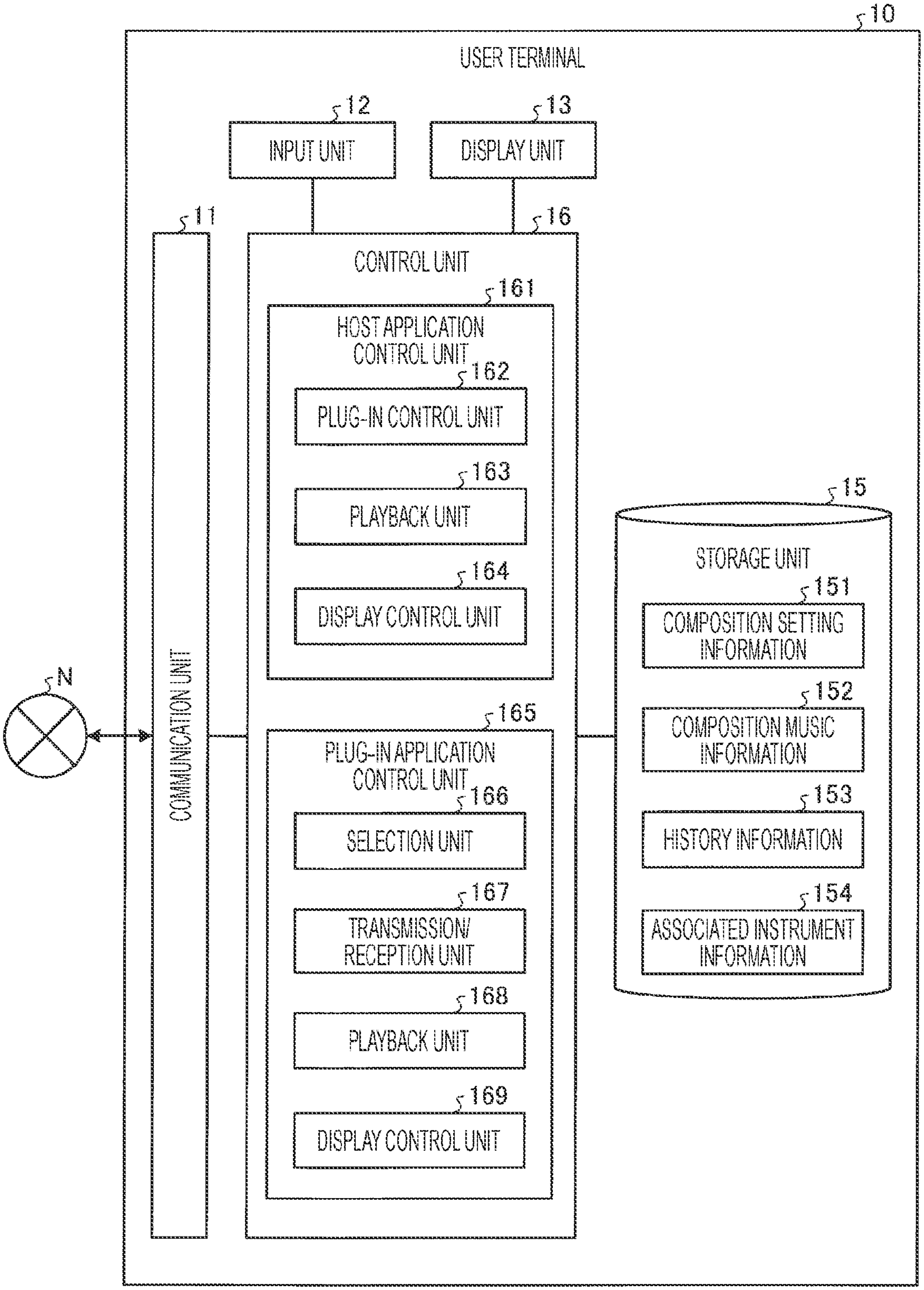
FIG. 7 is a diagram showing a configuration example of a user terminal according to the embodiment.

1-3. Configuration of Information Processing Device (User Terminal) According to Embodiment Next, the configuration of the user terminal 10, which is one example of the information processing device according to the present disclosure, will be described with reference to FIG. 7. FIG. 7 is a diagram showing a configuration example of the user terminal 10 according to the embodiment of the present disclosure. As shown in FIG. 7, the user terminal 10 includes a communication unit 11, an input unit 12, a display unit 13, a storage unit 15, and a control unit 16.

The communication unit 11 is implemented by, for example, a network interface card (NIC) or the like. The communication unit 11 is connected to the network N (Internet or the like) by wire or wirelessly, and transmits and receives information to and from the processing server 100, the management server 200, and the like through the network N.

The input unit 12 is an input device that accepts various operations from the user. For example, the input unit 12 is implemented by an operation key or the like included in the user terminal 10. The display unit 13 is a display device for displaying various types of information. For example, the display unit 13 is implemented by a liquid crystal display or the like. Note that when a touch panel is adopted for the user terminal 10, a part of the input unit 12 and the display unit 13 are integrated.

The storage unit 15 is implemented by, for example, a semiconductor memory element such as a random access memory (RAM) or a flash memory, or a storage device such as a hard disk or an optical disk. The storage unit 15 stores various data used for information processing.

As shown in FIG. 7, the storage unit 15 stores various information such as composition setting information 151, composition music information 152, history information 153, and associated instrument information 154. Hereinafter, each type of information will be described.

Figure 8:
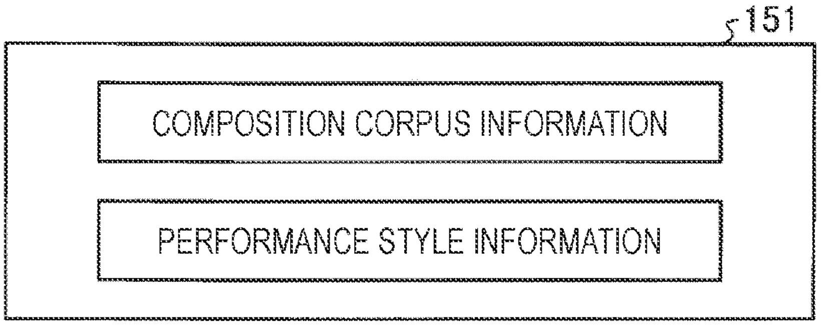
FIG. 8 is a diagram showing one example of composition setting information according to the embodiment.

The composition setting information 151 is information used by the plug-in 22 (second application) when performing automatic composition. FIG. 8 shows one example of the composition setting information 151 according to the embodiment. FIG. 8 is a diagram showing one example of the composition setting information 151 according to the embodiment.

As shown in FIG. 8, the composition setting information 151 includes composition corpus information and performance style information. As the composition corpus information, music data used as the learning data of the automatic composition or a place where the music data is saved (e.g., address of data server) is stored. Additionally, the composition corpus information includes, for example, information such as the average length and modulation of the notes of each piece of music.

As the performance style information, information such as the performance style of the music used as the learning data of the automatic composition is stored. The performance style includes, for example, information such as the overall shuffle ratio, chord and bass note splits, and overall balance.

Figure 9:
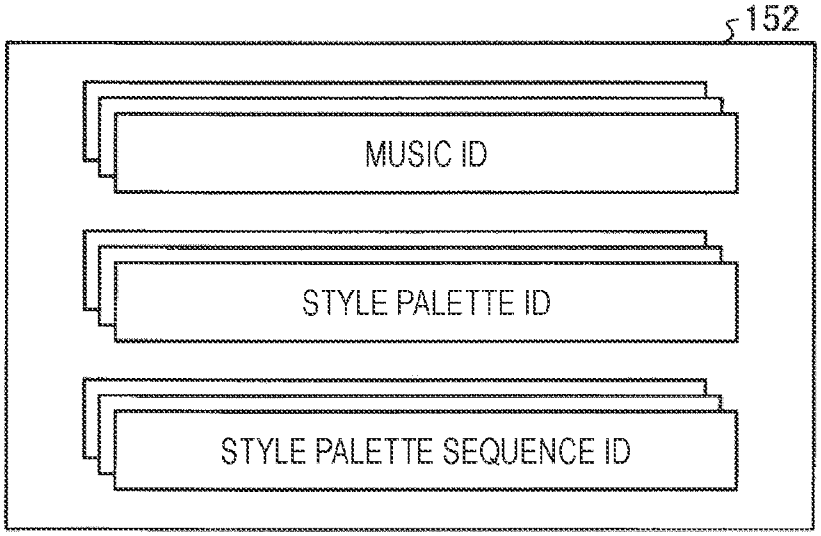
FIG. 9 is a diagram showing one example of composition music information according to the embodiment.

The composition music information 152 is information on the music used by the plug-in 22 when performing automatic composition. FIG. 9 shows one example of the composition music information 152 according to the embodiment. FIG. 9 is a diagram showing one example of the composition music information 152 according to the embodiment.

As shown in FIG. 9, the composition music information 152 includes a music ID, a style palette ID, and a style palette sequence ID. The music ID indicates identification information for uniquely identifying existing music used as learning data. The style palette ID indicates identification information for identifying a style palette including multiple pieces of existing music. The style palette sequence ID indicates identification information for identifying a style palette sequence including multiple style palettes.

Figure 10:
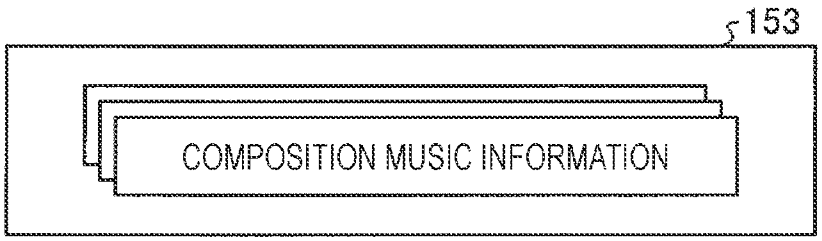
FIG. 10 is a diagram showing one example of history information according to the embodiment.

The history information 153 indicates the history of operations by the user in the host application 20 and the plug-in 22, and the history of music created by the user. FIG. 10 shows one example of the history information 153 according to the embodiment. FIG. 10 is a diagram showing one example of the history information 153 according to the embodiment.

As shown in FIG. 10, the history information 153 includes composition music information. The composition music information includes music data transmitted from the processing server 100, multiple candidate data included in the music data (e.g., music data 35 including four types of subdivisions generated on the basis of certain setting information, and the like as shown in FIG. 2), and music data edited by the user.

Figure 11:
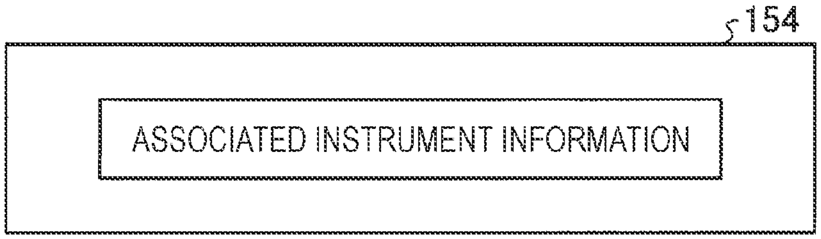
FIG. 11 is a diagram showing one example of associated instrument information according to the embodiment.

The associated instrument information 154 indicates instrument information set for music data transmitted from the processing server 100 and multiple pieces of candidate data included in the music data. FIG. 11 shows one example of the associated instrument information 154 according to the embodiment. FIG. 11 is a diagram showing one example of the associated instrument information 154 according to the embodiment.

As shown in FIG. 11, the associated instrument information 154 includes associated instrument information. The associated instrument information indicates information for identifying the instrument set for virtually playing music data transmitted from the processing server 100 or multiple pieces of candidate data included in the music data, the name of the instrument set for the music data, and the like. For example, as the associated instrument information, different information can be set for each of the melody, chord, and bass note.

Returning to FIG. 7, the description will be continued. For example, the control unit 16 is implemented by a central processing unit (CPU), a micro processing unit (MPU), a graphics processing unit (GPU), or the like executing a program (e.g., information processing program according to the present disclosure) stored inside the user terminal 10 with a random access memory (RAM) or the like as a work area. Additionally, the control unit 16 is a controller, and may be implemented by, for example, an integrated circuit such as an application specific integrated circuit (ASIC) or a field programmable gate array (FPGA).

As shown in FIG. 7, the control unit 16 has a host application control unit 161 and a plug-in application control unit 165, and achieves or executes an information processing function and operation described below. The host application control unit 161 includes a plug-in control unit 162, a playback unit 163, and a display control unit 164. The plug-in application control unit 165 includes a selection unit 166, a transmission/reception unit 167, a playback unit 168, and a display control unit 169. Note that the internal configuration of the control unit 16 is not limited to the configuration shown in FIG. 7, and may be another configuration as long as it is a configuration for performing information processing described later.

The host application control unit 161 controls the host application 20 (DAW as first application).

The plug-in control unit 162 controls the operation of various plug-ins in the host application 20. For example, the plug-in control unit 162 controls operations such as calling a plug-in in the host application 20, activating a plug-in on the host application 20, and copying data in a plug-in to the host application 20.

For example, the plug-in control unit 162 individually sets instrument information for designating a tone quality when the plug-in plays back a chord, a melody, or a bass note included in the music data received from the processing server 100. For example, the plug-in control unit 162 reads out information on virtual instruments registered on the DAW, and sets the information on the virtual instruments to play each of the chord, melody, or bass note included in the music data of the plug-in.

The playback unit 163 controls playback processing in the host application 20. The playback unit 163 has a synchronous playback function, a playback information transmission function, a sound synthesis playback function, a playback style arrangement function, and the like in the host application 20.

For example, the playback unit 163 cooperates with the synchronous playback function of the playback unit 168 of the plug-in to play back the music data held by the plug-in. For example, the playback unit 163 can pass time information indicating the position where the host application is playing back to the plug-in to acquire and play back the melody, chord, and bass note of the portion corresponding to the playback position.

Additionally, in a case where the performance style or the like is set in the plug-in, the playback unit 163 may process the playback data according to the performance style and play back the processed data.

The display control unit 164 controls display control processing in the host application 20. For example, the display control unit 164 has a performance information display function for displaying information on each track on a screen (display unit 13), a composition music information pasting function for copying information such as music data to a track, and the like.

Additionally, the display control unit 164 controls the plug-in to separately display each window displaying information regarding the chord, melody, or bass note included in the music data received from the processing server 100. For example, the display control unit 164 displays a user interface corresponding to each of the chord, melody, or bass note on the screen of the DAW, as shown in FIG. 3.

Additionally, the display control unit 164 controls transmission and reception of information between each window displaying information regarding the chord, melody, or bass note and a window displaying information regarding the host application, according to the user's operation. As a result, the user can quickly perform processing such as copying the automatically composed music data to an arbitrary track or performing editing on the DAW.

Note that the display control unit 164 may control not only the exchange of information between the host application and the plug-in but also the exchange of information between the displayed plug-in windows. That is, the display control unit 164 may control transmission and reception of information between windows each displaying information regarding the chord, melody, or bass note, according to the user's operation.

The plug-in application control unit 165 controls the operation of the plug-in running on the host application 20. For example, the plug-in application control unit 165 activates the plug-in on the host application 20 according to the user's operation.

The selection unit 166 selects setting information for controlling a composition function based on machine learning. For example, the selection unit 166 selects, as setting information, designation information for designating the material music to be learning data for machine learning. Specifically, the designation information corresponds to the style palette shown in FIG. 4 and other drawings.

For example, according to the user's operation, the selection unit 166 selects designation information that is stored in the storage unit 15 in advance and includes feature information indicating a feature of the designation information and multiple pieces of material music associated with the feature information. For example, the user refers to the feature information ("bright", "dark", or the like) of the style palette through the window 40 or the like shown in FIG. 4. Then, based on the feature information, the user selects a style palette including the desired feature information for the music to be composed by AI.

Additionally, the selection unit 166 may select combined designation information in which first designation information corresponding to some bars of the music data composed by the external server and second designation information corresponding to some other bars thereof are combined. As described above, the combined designation information corresponds to the style palette sequence. Additionally, the first designation information corresponds to the style palette which is the setting information for composing some bars. Additionally, the second designation information corresponds to the style palette which is the setting information for composing some other bars.

Also, in addition to the style palette, the selection unit 166 may select detailed setting information regarding the music data to be composed.

For example, the selection unit 166 may select, as setting information, the length information of notes included in the music data composed by the processing server 100 on the basis of the style palette. For example, the selection unit 166 accepts the selection of the note length information from the user through the display of the slider or the like of the setting information 33 included in the user interface 30 or the like shown in FIG. 2.

Additionally, the selection unit 166 may select, as setting information, information for determining the probability that constituent notes included in a chord appear in the melody of the music data composed by the processing server 100 on the basis of the style palette. For example, the selection unit 166 accepts the selection of the information for determining the probability that constituent notes included in a chord appear in the melody from the user, through the display of the slider or the like of the setting information 32 included in the user interface 30 or the like shown in FIG. 2.

Additionally, the selection unit 166 may select, as setting information, information for determining the type and amount of material music other than the material music included in the style palette in the music data composed by the processing server 100 on the basis of the style palette. For example, the selection unit 166 accepts the selection of the information for determining the type and amount of material music other than the material music included in the style palette from the user, through the display of the slider or the like of the setting information 34 included in the user interface 30 or the like shown in FIG. 2.

Additionally, the selection unit 166 may select information other than the style palette as the setting information for automatic composition. As one example, the selection unit 166 may select, as setting information, a chord progression in the composed music on the basis of the user's operation. In this case, the processing server 100 automatically generates music data on the basis of the chord progression selected by the user.

The transmission/reception unit 167 transmits the setting information selected by the selection unit 166 to the processing server 100 that executes the composition function based on machine learning through the network N, and receives music data composed by the processing server 100.

For example, the transmission/reception unit 167 transmits a style palette selected by the selection unit 166 to the processing server 100. Then, the transmission/reception unit 167 receives music data generated by the processing server 100 on the basis of the style palette.

The transmission/reception unit 167 receives a chord in a bar of a specified length, a melody in the bar, and a bass note in the bar, for example, as music data. Such information may be data such as MIDI, MusicXML, or the like, information of DAW original standard, or waveform data (WAV file or the like).

Additionally, the transmission/reception unit 167 may transmit a style palette sequence selected by the selection unit 166 to the processing server 100. In this case, the transmission/reception unit 167 receives music data generated by the processing server 100 on the basis of the style palette sequence.

When the transmission/reception unit 167 receives music data composed by the processing server 100 on the basis of the style palette sequence, the transmission/reception unit 167 may store the music data in association with the style palette sequence in the storage unit 15. As a result, the user can refer to what kind of music data is created by what kind of style palette sequence as a history, so that such information can be utilized for composition.

Additionally, the transmission/reception unit 167 may transmit various setting information other than the style palette and the style palette sequence to the processing server 100. For example, the transmission/reception unit 167 transmits, to the processing server 100, note length information, information for determining the probability that constituent notes included in a chord appear in the melody, information for determining the type and amount of material music other than the material music included in the style palette, and the like set by the user.

Additionally, when the user performs a playback or editing operation on music data composed by the processing server 100 after receiving the music data, the transmission/reception unit 167 may transmit information regarding the playback or editing operation to the processing server 100. As a result, the processing server 100 can acquire information such as how the composed music data is used or how much the composed music data is used. In this case, the processing server 100 may adjust the learning method and the music data to be generated on the basis of such information. For example, the processing server 100 may analyze past music data used by more users and preferentially generate music data having such characteristics.

The playback unit 168 controls playback processing in the plug-in. For example, the playback unit 168 plays back music data received by the transmission/reception unit 167. Specifically, the playback unit 168 sets arbitrary instrument information for each of the melody, chord, and bass note included in the music data, and plays back each piece of data. Note that the playback unit 168 may play back the melody, the chord, and the bass note in combination.

The display control unit 169 controls display processing in the plug-in. For example, the display control unit 169 displays a window such as a user interface showing plug-in information on the screen.

As shown in FIG. 2, for example, the display control unit 169 acquires four types of music data of four bars and displays the four candidates side by side in the user interface. The user can select the final candidate by connecting good parts along the time axis (i.e., performing comping) from the four types of music data candidates. For example, the user can delete or connect some notes in a melody, change the length of the notes, or change the pitch of the notes.

Additionally, the display control unit 169 may perform control to retrieve the history of past music data composed by the processing server 100 from the storage unit 15 and display the history of the past music data according to the user's operation. As a result, the user can proceed with the composition while referring to the data composed by the processing server 100 in the past. For example, the user can determine the final candidate by comparing the latest music created by editing with the history of music edited in the past.

Additionally, the display control unit 169 may perform control to retrieve the history of editing operations performed on the past music data composed by the processing server 100 from the storage unit 15 and also display the editing operations performed on the past music data. As a result, the user can refer to the editing operation performed in the past, the music data generated by the editing operation, for example, so that the composition can be performed efficiently.

Note that while FIGS. 2 and 3 show an example in which music data is displayed on the user interface in a format like a so-called piano roll, which shows the pitch and the note length, the display control unit 169 may display the music data in a staff notation or a format unique to DAW.

Figure 12:
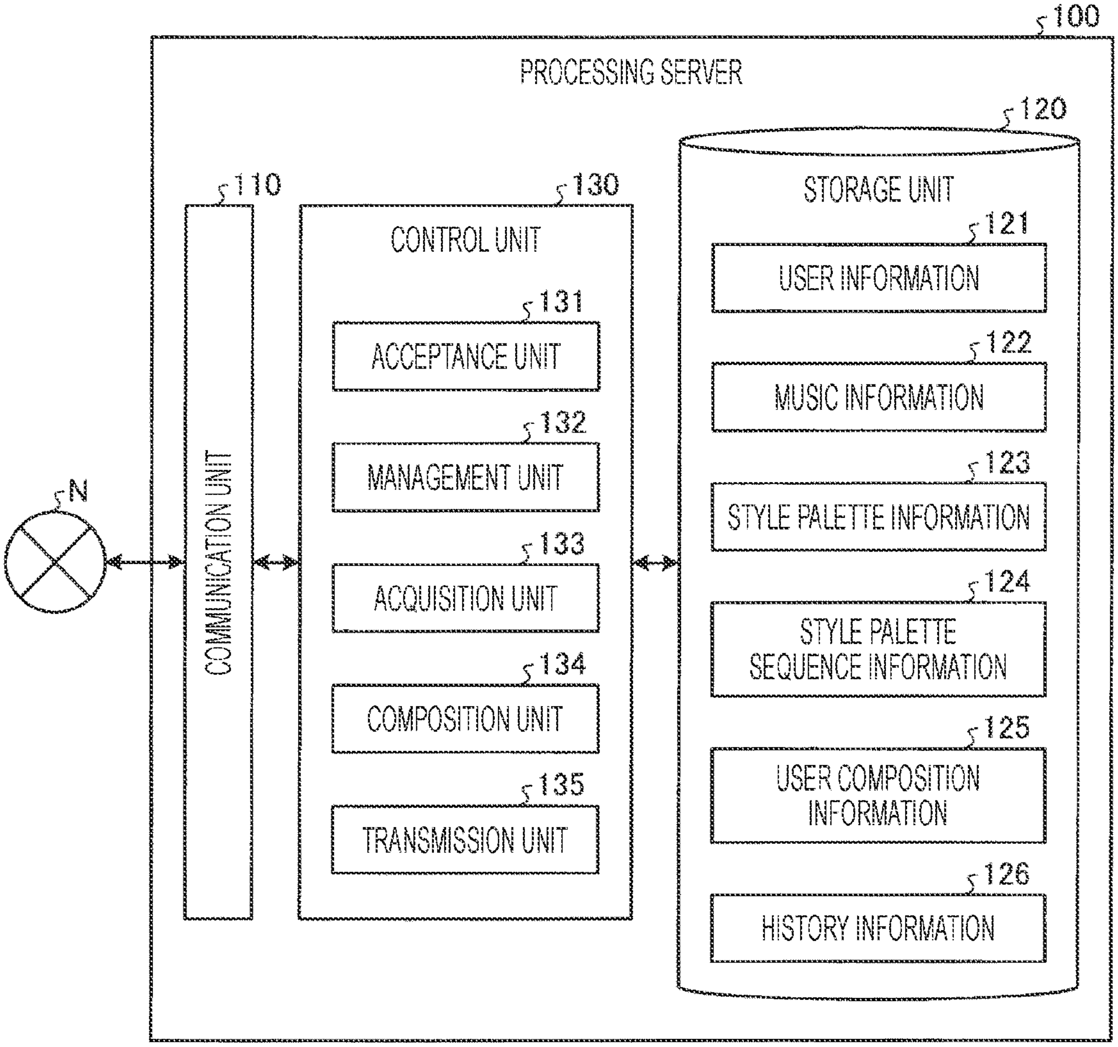
FIG. 12 is a diagram showing a configuration example of a processing server according to the embodiment.

1-4. Configuration of External Server (Processing Server) According to Embodiment Next, the configuration of the processing server 100 which is one example of the external server according to the present disclosure will be described. FIG. 12 is a diagram showing a configuration example of the processing server 100 according to the embodiment.

As shown in FIG. 12, the processing server 100 includes a communication unit 110, a storage unit 120, and a control unit 130. Note that the processing server 100 may have an input unit (e.g., keyboard, mouse, and the like) that accepts various operations from an administrator or the like that manages the processing server 100, and a display unit (e.g., liquid crystal display or the like) for displaying various information.

The communication unit 110 is implemented by, for example, a NIC or the like. The communication unit 210 is connected to the network N by wire or wirelessly, and transmits and receives information to and from the user terminal 10, the management server 20, and the like through the network N.

The storage unit 120 is implemented by, for example, a semiconductor memory element such as a RAM or a flash memory, or a storage device such as a hard disk or an optical disk. The storage unit 120 stores various data used for information processing.

As shown in FIG. 12, the storage unit 120 stores various information such as user information 121, music information 122, style palette information 123, style palette sequence information 124, user composition information 125, and history information 126. Hereinafter, each type of information will be described.

Figure 13:
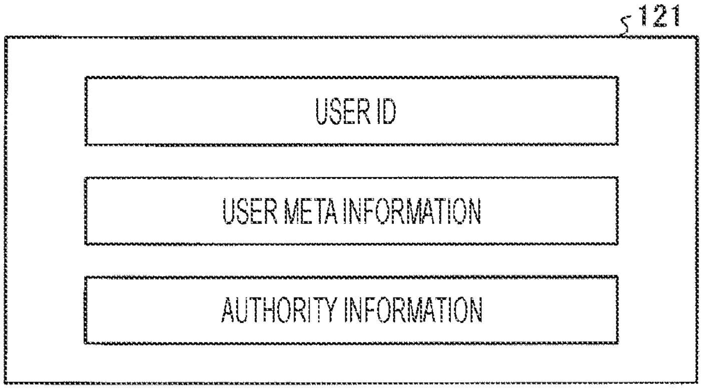
FIG. 13 is a diagram showing one example of user information according to the embodiment.

The user information 121 indicates information of the user of the plug-in 22 (second application). FIG. 13 shows one example of the user information 121 according to the embodiment. FIG. 13 is a diagram showing one example of the user information 121 according to the embodiment.

As shown in FIG. 13, the user information 121 includes a user ID, user meta information, and authority information. The user ID indicates identification information for uniquely identifying the user. The user meta information is additional information of the user such as the user's name and address. The authority information is, for example, identification information such as whether the user of the plug-in is an administrator, a general user, or a special user.

Figure 14:
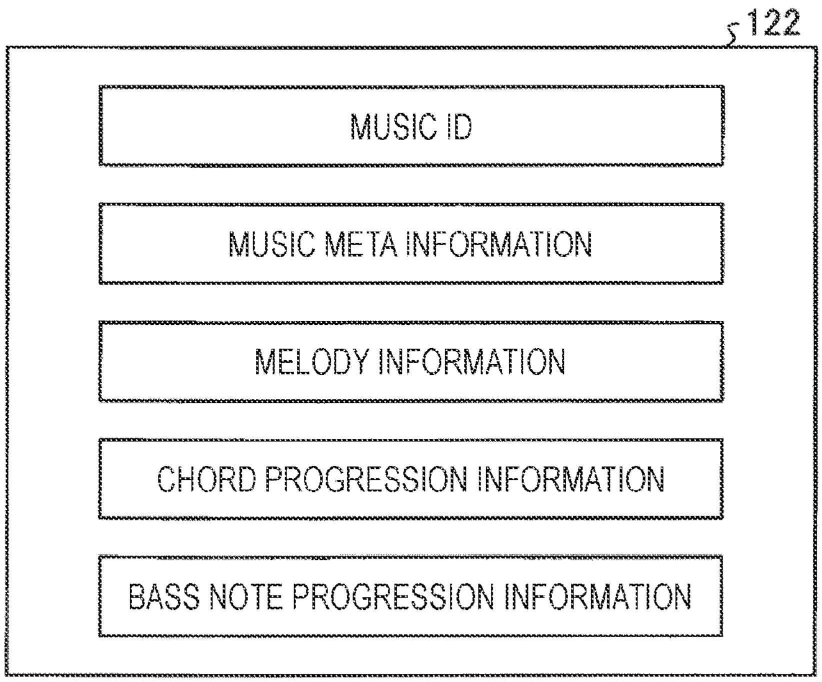
FIG. 14 is a diagram showing one example of music information according to the embodiment.

The music information 122 indicates information on music used for automatic composition processing. FIG. 14 shows one example of the music information 122 according to the embodiment. FIG. 14 is a diagram showing one example of the music information 122 according to the embodiment.

As shown in FIG. 14, the music information 122 includes a music ID, music meta information, melody information, chord progression information, and bass note progression information. The music ID indicates identification information for uniquely identifying the music. The music meta information is, for example, information such as the music title, composer, date, and genre of the music. The melody information is, for example, scale information or the like that expresses a vocal part. The chord progression information is, for example, time-series information that expresses the transition of chords in the music. The bass note progression information is time-series information indicating the root note of the chord progression information.

Figure 15:
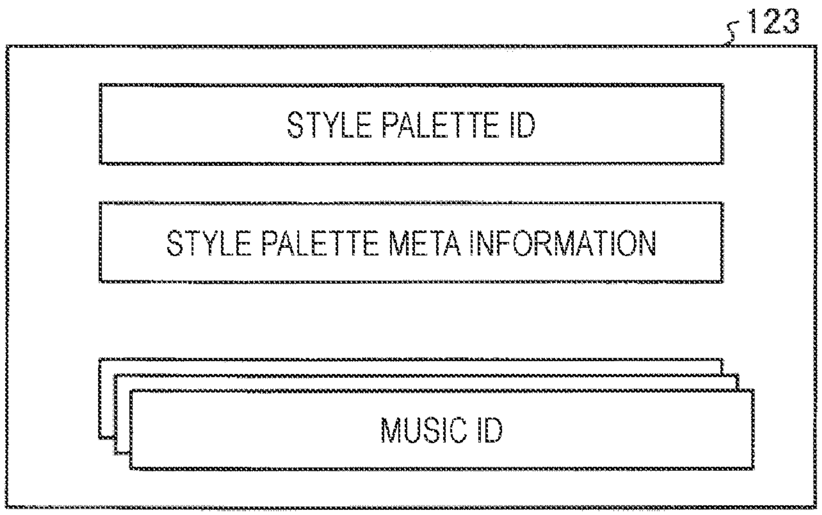
FIG. 15 is a diagram showing one example of style palette information according to the embodiment.

The style palette information 123 indicates information regarding the style palette used for automatic composition processing. FIG. 15 shows one example of the style palette information 123 according to the embodiment. FIG. 15 is a diagram showing one example of the style palette information 123 according to the embodiment.

As shown in FIG. 15, the style palette information 123 includes a style palette ID, style palette meta information, and the music ID. The style palette ID indicates identification information for uniquely identifying the style palette. The style palette meta information includes, for example, information such as the name of the style palette, subjective feature information such as bright or dark, and fast or slow, the structure such as a song including a verse, a bridge, and a chorus, and the feature of chord progressions. Note chord progression information or the like may be added to the name of the style palette meta information. As a result, the user can intuitively grasp the features of the style palette. Additionally, as shown in FIG. 15, multiple music IDs are registered in association with the style palette. The style palette information 123 is registered by the management server 200 or the like, for example.

Figure 16:
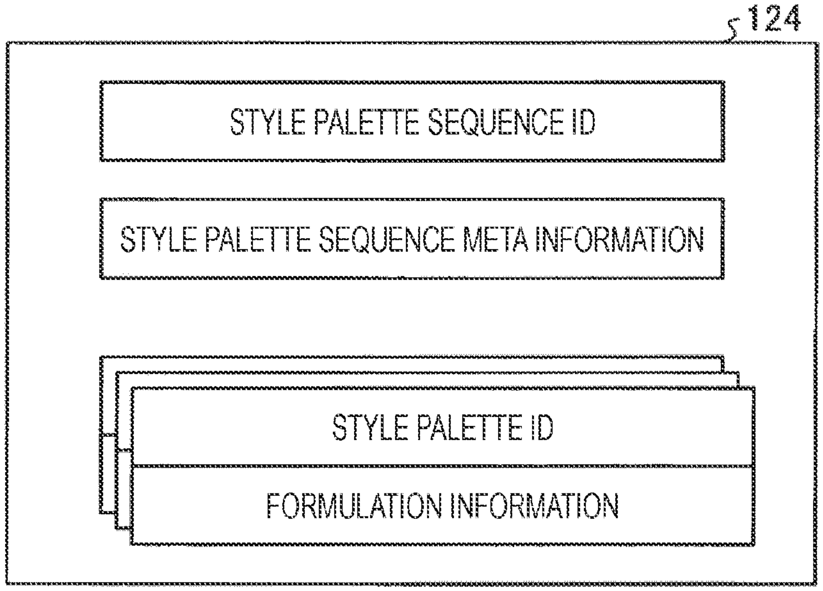
FIG. 16 is a diagram showing one example of style palette sequence information according to the embodiment.

The style palette sequence information 124 indicates information regarding the style palette sequence used for automatic composition processing. FIG. 16 shows one example of the style palette sequence information 124 according to the embodiment. FIG. 16 is a diagram showing one example of the style palette sequence information 124 according to the embodiment.

As shown in FIG. 16, the style palette sequence information 124 includes a style palette sequence ID, style palette sequence meta information, the style palette ID, and formulation information. The style palette sequence ID indicates identification information for uniquely identifying the style palette sequence. The style palette sequence meta information is, for example, the name of the style palette sequence and subjective feature information such as bright or dark, and fast or slow. Additionally, as shown in FIG. 16, multiple style palette IDs are registered in association with the style palette sequence. Additionally, the formulation information is information regarding the arrangement of style palettes in the style palette sequence.

Figure 17:
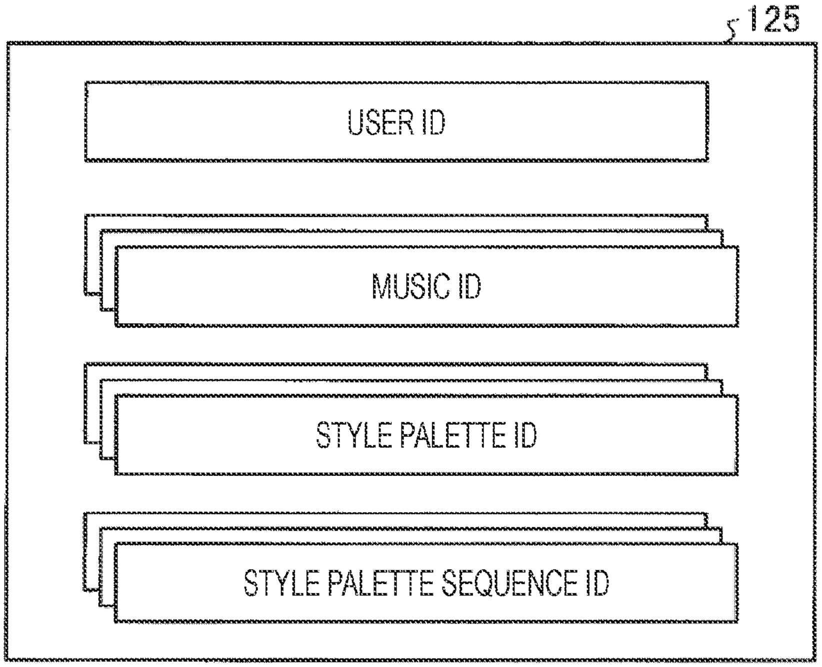
FIG. 17 is a diagram showing one example of user composition information according to the embodiment.

The user composition information 125 indicates information regarding composition received from the user terminal 10. FIG. 17 shows one example of the user composition information 125 according to the embodiment. FIG. 17 is a diagram showing one example of the user composition information 125 according to the embodiment.

As shown in FIG. 17, the user composition information 125 includes the user ID, the music ID, the style palette ID, and the style palette sequence ID. The user ID indicates identification information for uniquely identifying the user. The music ID indicates identification information for identifying the music generated for the user identified by the user ID. The style palette ID indicates identification information for identifying the style palette transmitted from the user identified by the user ID. The style palette sequence ID indicates identification information for identifying the style palette sequence transmitted from the user identified by the user ID.

Figure 18:
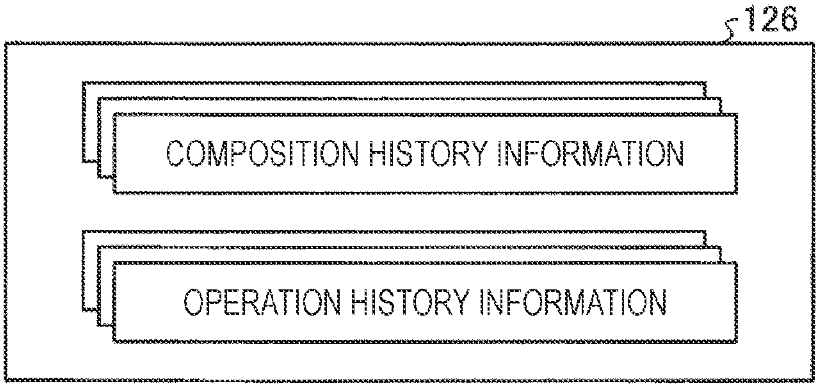
FIG. 18 is a diagram showing one example of history information according to the embodiment.

The history information 126 is various histories related to information processing of the processing server 100. FIG. 18 shows one example of the history information 126 according to the embodiment. FIG. 18 is a diagram showing one example of the history information 126 according to the embodiment.

As shown in FIG. 18, the history information 126 includes composition history information and operation history information. The composition history information is the history of music generated by the processing server 100. The operation history information is information such as the history of editing operations by the user on the user terminal 10. The operation history information is, for example, information on the user performing recomposition, selecting composed music data, editing the music data, information on the number of playbacks and the number of times playback is skipped, and the like. These pieces of information may be used as learning data of a composition unit 134, which will be described later.

Returning to FIG. 12, the description will be continued. The control unit 130 is implemented by, for example, the CPU, MPU, GPU, or the like executing a program stored inside the processing server 100 with a RAM or the like as a work area. Additionally, the control unit 130 is a controller, and may be implemented by, for example, an integrated circuit such as an ASIC or an FPGA.

As shown in FIG. 12, the control unit 130 has an acceptance unit 131, a management unit 132, an acquisition unit 133, a composition unit 134, and a transmission unit 135, and achieves or executes an information processing function and operation described below. Note that the internal configuration of the control unit 130 is not limited to the configuration shown in FIG. 12, and may be another configuration as long as it is a configuration for performing information processing described later.

The acceptance unit 131 accepts various information transmitted from the management server 200. For example, the acceptance unit 131 accepts information on the user of the plug-in, information regarding the style palette, information on the material music used in the automatic composition, and the like. For example, when the user purchases and activates a product (plug-in, DAW, or the like), the acceptance unit 131 performs processing of issuing a user ID to the user and accepting information regarding the user. Additionally, the acceptance unit 131 accepts registration of music to be linked to a style palette, editing of the style palette, and the like according to operations and commands from the management server 200.

The management unit 132 manages various information accepted by the acceptance unit 131. For example, the management unit 132 stores various information in the storage unit 120, and updates the stored information as appropriate.

For example, when the style palette registration processing by the management unit 132 is completed, the user can acquire and browse a list of style palette information.

The acquisition unit 133 acquires a request for automatic composition transmitted from the user terminal 10. Additionally, the acquisition unit 133 acquires setting information transmitted together with the request. For example, the acquisition unit 133 acquires a style palette that the user desires as setting information.

The composition unit 134 composes music on the basis of the setting information acquired by the acquisition unit 133. The composition unit 134 may compose music by using various existing music generation algorithms. For example, the composition unit 134 may use a music generation algorithm using a Markov chain, or may use a music generation algorithm using deep learning. As described above, the composition unit 134 generates multiple pieces of music data for a single piece of setting information transmitted from the user. As a result, the user can receive multiple proposals from the composition unit 134, and thus can proceed with the composition by using more diverse information.

When music data is generated by composition processing, the composition unit 134 associates the generated music data with the user ID of the user who transmitted the style palette and stores it in the storage unit 120 as history information.

The transmission unit 135 transmits the music data generated by the composition unit 134 to the user terminal 10.

1-5. Procedure of Information Processing According to Embodiment

Figure 19:
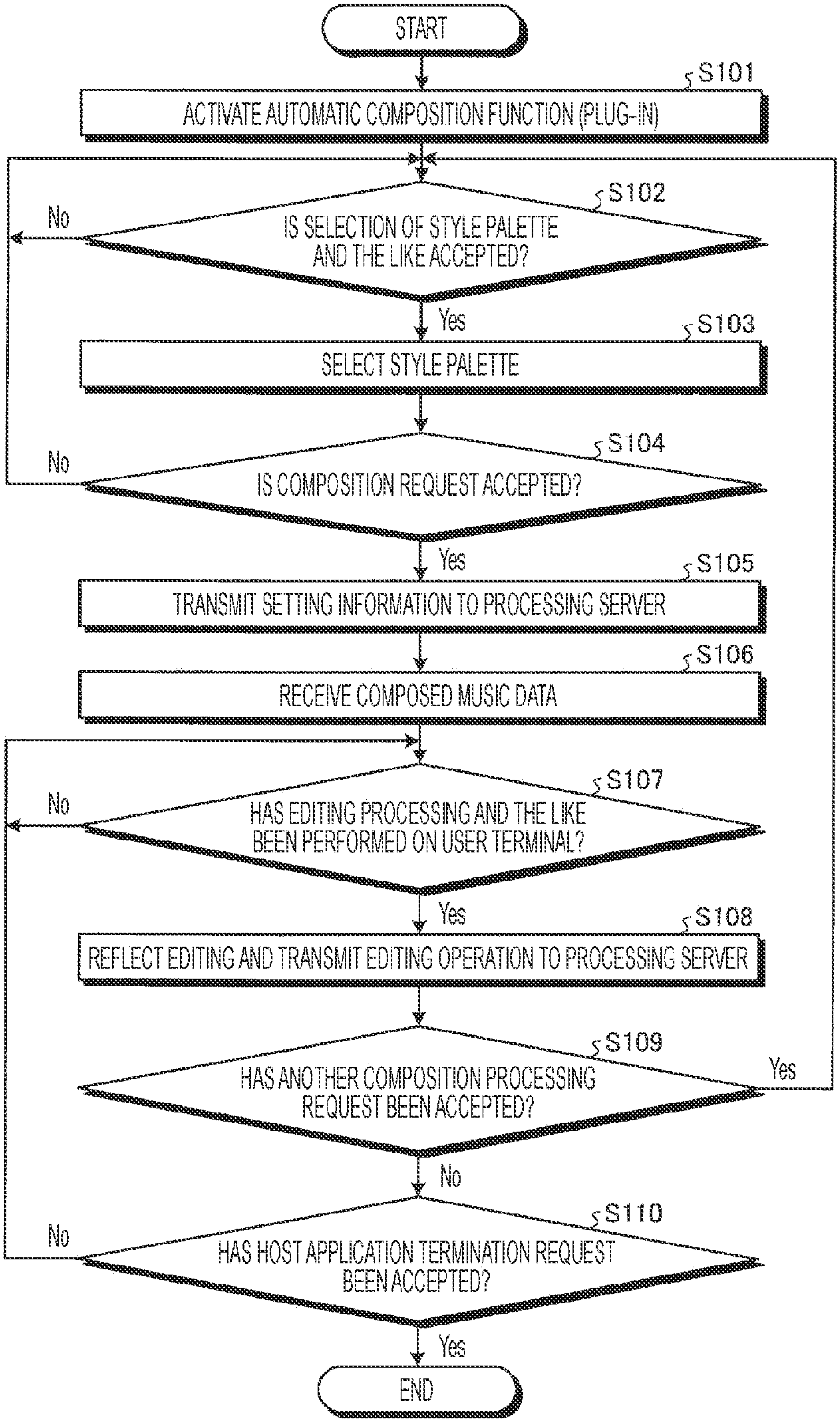
FIG. 19 is a flowchart showing the procedure of information processing according to the embodiment.

Next, the procedure of information processing according to the embodiment will be described with reference to FIG. 19. FIG. 19 is a flowchart showing the procedure of information processing according to the embodiment.

As shown in FIG. 19, the user terminal 10 activates the automatic composition function (plug-in) on the host application according to the user's operation (S101).

Subsequently, the user terminal 10 determines whether or not selection of a style palette or the like is accepted from the user (step S102). If selection of a style palette or the like is not accepted from the user (step S102; No), the user terminal 10 stands by until a selection is accepted.

On the other hand, if selection of a style palette or the like is accepted from the user (step S102; Yes), the user terminal 10 selects a style palette according to the user's operation (step S103). Note that the user terminal 10 may accept various setting information other than the style palette in step S102.

Thereafter, the user terminal 10 determines whether or not a composition request is accepted from the user (step S104). If a composition request is not accepted from the user (step S104; No), the user terminal 10 stands by until a request is accepted.

On the other hand, if a composition request is accepted from the user (step S104; Yes), the user terminal 10 transmits the accepted setting information together with the composition request to the processing server 100 (step S105). Thereafter, the user terminal 10 receives music data composed (generated) by the processing server 100 (step S106).

Subsequently, the user terminal 10 determines whether or not editing processing or the like has been performed by the user on the user terminal 10 (step S107). If the editing processing or the like has not been performed (step S107; No), the user terminal 10 stands by until the editing processing or the like is accepted (step S107).

On the other hand, if the editing processing or the like has been performed (step S107; Yes), the user terminal 10 reflects the editing and transmits information regarding the editing operation to the processing server 100 (step S108).

Thereafter, the user terminal 10 determines whether or not another composition request is accepted from the user (step S109). If a composition request is accepted from the user (step S109; Yes), the user terminal 10 accepts new setting information from the user.

On the other hand, if a composition request is not accepted from the user (step S109; No), the user terminal 10 determines whether or not a host application termination request is accepted (step S110). If a host application termination request is not accepted (step S110; No), the user terminal 10 continues the editing processing of the music data currently received. On the other hand, if a host application termination request is accepted (step S110; Yes), the user terminal 10 terminates the host application and the plug-in, and ends the processing.

2. Modification

The information processing system 1 described above may be implemented in various different forms other than the above embodiment. Hence, modifications of the embodiment will be described below.

2-1. Form of Music Data

In the above embodiment, the types of information set in the associated instrument information 154 and the like of the music data in the plug-in are assumed to be melody, chord, and bass note. However, the present invention is not limited to this. For example, the associated instrument information 154 can be applied not only to melody, chord, and bass note, but also to the performance part of each instrument of a full orchestra, for example.

2-2. Host Application

In the above embodiment, DAW is assumed as the host application. However, the present invention is not limited to this. For example, the host application may be a video editing application or the like instead of a music editing application.

2-3. Control by DAW

In the above embodiment, an example is shown in which the user terminal 10 selects setting information on the plug-in and transmits the selected information to the processing server 100. However, the setting information and the like may be selected by the host application. That is, the user terminal 10 may transmit the setting information (e.g., chord progression) and the like selected in the host application to the processing server 100 to enable execution of the automatic composition processing. In this case, the host application may provide the plug-in with an application programming interface (API) for the plug-in to use information of the host application, and allow acquisition of information for generating a style palette from the host application, and control transmission and reception processing with the processing server 100.

For example, the user terminal 10 uses a chord generation function of the DAW, which is the host application, to generate an arbitrary chord progression. Then, the user terminal 10 may execute automatic composition on the basis of the chord progression generated by the DAW. For example, the user terminal 10 inputs the chord progression generated by the DAW into the plug-in, and transmits the chord progression to the processing server 100 through the plug-in.

That is, the host application performs control to transmit information regarding the chord progression generated in the host application to the plug-in. Then, the plug-in selects, as setting information, the information regarding the chord progression generated in the host application. Moreover, the plug-in transmits the information regarding the chord progression generated in the host application to the processing server 100, and receives music data composed on the basis of the information regarding the chord progression.

Additionally, the user terminal 10 may automatically select a style palette to be transmitted to the processing server 100 on the basis of the chord progression generated by the DAW. For example, the user terminal 10 may select a style palette having features similar to the chord progression generated by the DAW, and transmit the style palette to the processing server 100. Additionally, the user terminal 10 may sequentially select style palettes according to the chord progression generated by the DAW, generate a style palette sequence, and transmit the generated style palette sequence to the processing server 100.

Additionally, the user terminal 10 may perform settings so that the plug-in is allowed access to information of a base track on the host application. For example, the user sets the base track of the DAW so that the track follows automatically composed music data. In this case, the base track is automatically complemented according to music data generated by the processing server 100 and a chord progression generated by the DAW, for example.

Additionally, the user terminal 10 may perform settings so that the plug-in is allowed access to information of a melody track on the host application. For example, the user sets the melody track of the DAW so that the track follows automatically composed music data. In this case, when the user selects a certain bar and requests automatic composition, the generated melody is automatically inserted into the track. Additionally, when the user sets the DAW to a mode (called comping mode or the like) for editing by combining multiple pieces of music data, the user can complete the melody by selecting desired parts of multiple tracks appearing on the screen.

Additionally, the user terminal 10 may perform settings so that the plug-in is allowed access to information of a melody track and MIDI input on the host application. In this case, the user can perform composition by making full use of both the automatic composition function and the MIDI input. For example, the user inputs an arbitrary chord progression in four bars and causes the DAW to loop. Then, the user performs input with the MIDI keyboard according to the loop performance. By uploading the chord progression and melody information to the processing server 100, the user terminal 10 can automatically create a personal style palette on the processing server 100 side. For example, in a newly added style palette menu on the DAW, the user can give instructions to start or stop creating, save, name, or delete the personal style palettes, for example. Such a personal style palette may be made publicly available through the style palette menu.

Additionally, the user terminal 10 may perform settings so that the plug-in is allowed access to information of an audio track on the host application. The audio track is, for example, a track on which an instrument performance sound is recorded, and is, for example, a track including a chord performance by a piano, a bass note performance by a bass guitar, a melody by a lead instrument, or the like. The plug-in accesses an audio track, analyzes audio data such as a melody, chord, and bass note of each track by signal processing, and obtains NIDI information of the melody, chord progression information, and the like. The plug-in may use, for example, 12-tone analysis technology or the like for analysis. In this case, the user terminal 10 may transmit the analyzed information to the processing server 100 to automatically infer the optimum chord progression by machine learning or the like. Then, the processing server 100 defines a style palette sequence on the basis of this chord progression information. As a result, the user can perform assisted composition based on the style palette sequence generated by the processing server 100, so that the entire composition can be recomposed or the composition can be partially recomposed and replaced, for example.

Additionally, the user terminal 10 may perform settings so that the plug-in is allowed access to information of an existing master track on the host application. The master track is obtained by performing mixing in the DAW and mixing down to two-channel stereo, for example. The plug-in accesses the master track, analyzes the audio data by signal processing, and obtains chord progression information and the like. The user terminal 10 may transmit the analyzed information to the processing server 100 to automatically infer the optimum chord progression by machine learning or the like. Then, the processing server 100 defines a style palette sequence on the basis of this chord progression information. As a result, the user can perform assisted composition based on the style palette sequence generated by the processing server 100, so that the entire composition can be recomposed or the composition can be partially recomposed and replaced, for example.

As described above, in a case where the host application is provided with various functions, the user terminal 10 may apply the functions to the plug-in and use them for information processing according to the present disclosure. For example, as described above, the user terminal 10 can generate a style palette sequence on the basis of a chord progression generated by the DAW, and make the style palette sequence publicly available on the network to invigorate composition processing among users.

2-4. Mode of Information Processing System

In the embodiment, it is assumed that the processing server 100 is installed on a cloud network. However, the present invention is not limited to this example, and as long as communication with the user terminal 10 is possible, the processing server 100 and the management server 200 may installed on a network such as a local area network (LAN).

In the embodiment, an example in which the first application and the second application are installed in the user terminal 10 is shown. However, the first application and the second application may be applications installed in different devices. For example, the user terminal 10 may have the function of only the first application, and play back a sound source, for example, by controlling the second application installed on another device such as a tablet terminal or a smartphone.

3. Other Embodiments

The processing according to each of the above embodiments may be carried out in various different forms other than the above embodiments.

Additionally, among the processing described in each of the above embodiments, all or part of the processing described as being automatically performed can be performed manually, or all or part of the processing described as being manually performed can be performed automatically by a known method. In addition, the processing procedure, specific name, and information including various data and parameters shown in the above document and drawings can be arbitrarily changed unless otherwise specified. For example, the various information shown in the drawings is not limited to the illustrated information.

Additionally, each component of each illustrated device is a functional concept, and does not necessarily have to be physically configured as shown in the drawing. That is, the specific form of distribution or integration of each device is not limited to that shown in the drawing, and all or part of the device can be functionally or physically distributed or integrated in arbitrary units according to various loads and usage conditions.

Additionally, the above-described embodiments and modifications can be appropriately combined as long as the processing contents do not contradict each other.

Additionally, the effect described in the present specification is merely an illustration and is not restrictive. Hence, other effects can be obtained.

4. Effect of Information Processing Device According to the Present Disclosure As described above, the information processing device (user terminal 10 in embodiment) according to the present disclosure controls a first application (host application 20 in embodiment) and a second application (plug-in 22 in embodiment) that functions as a plug-in that extends the functions of the first application. The first application includes a control unit (host application control unit 161 in embodiment) that controls the operation of the second application in the first application. The second application includes a selection unit (selection unit 166 in embodiment) that selects setting information for controlling a composition function based on machine learning, and a transmission/reception unit (transmission/reception unit 167 in embodiment) that transmits the setting information to an external server (processing server 100 in embodiment) that executes the composition function based on machine learning and receives music data composed by the external server through a network.

As described above, the information processing device according to the present disclosure handles the second application having the automatic composition function as a plug-in, and causes the external server to execute the actual composition processing. As a result, the information processing device can provide the user with an environment with good work efficiency while curbing the processing load. That is, the information processing device can improve convenience of the automatic composition function by AI.

The transmission/reception unit receives a chord in a bar of a specified length, a melody in the bar, and a bass note in the bar as music data. As a result, the information processing device can individually refer to and edit the music data, which can improve the user's convenience.

The control unit individually sets instrument information for designating a tone quality when playing back a chord, a melody, or a bass note included in the music data. As a result, the information processing device can provide various playback environments.

The control unit performs control to separately display each window displaying information regarding the chord, melody, or bass note included in the music data. As a result, the information processing device can improve convenience of the user's editing operation.

The control unit controls transmission and reception of information between each window displaying information regarding the chord, melody or bass note and a window displaying information regarding the first application, according to the user's operation. As a result, the information processing device can exchange information between the first application and the second application by operations such as drag and drop, so that convenience of the user's editing operation can be improved.

The control unit controls transmission and reception of information between windows each displaying information regarding the chord, melody, or bass note, according to the user's operation. As a result, the information processing device can improve convenience of the user's editing operation.

The selection unit selects, as setting information, designation information (style palette in embodiment) for designating material music to be learning data for machine learning. The transmission/reception unit transmits the designation information selected by the selection unit to the external server. As a result, the information processing device can execute automatic composition by designating various features that the user desires.

According to the user's operation, the selection unit selects designation information that is stored in a storage unit (storage unit 15 in embodiment) in advance and includes feature information indicating a feature of the designation information and multiple pieces of material music associated with the feature information. As a result, the information processing device can improve the convenience when the user selects the designation information.

The selection unit selects combined designation information (style palette sequence in embodiment) in which first designation information corresponding to some bars of music data composed by the external server and second designation information corresponding to some other bars thereof are combined. As a result, the information processing device can automatically generate various kinds of music.

When the transmission/reception unit receives music data composed by the external server on the basis of the combined designation information, the transmission/reception unit stores the combined designation information in association with the music data in the storage unit. As a result, the information processing device can improve the convenience when the user refers to combined designation information or the like which is the basis of music data created in the past.

The selection unit selects, as setting information, the length information of notes included in the music data composed by the external server on the basis of the designation information. The transmission/reception unit transmits the designation information and the note length information to the external server. As a result, the information processing device can generate music data having the characteristics that the user desires.

The selection unit selects, as setting information, information for determining the probability that constituent notes included in a chord appear in the melody of the music data composed by the external server on the basis of the designation information. The transmission/reception unit transmits the designation information and the information for determining the probability that the constituent notes included in a chord appear in the melody to the external server. As a result, the information processing device can generate music data having the characteristics that the user desires.

The selection unit selects, as setting information, information for determining the type and amount of material music other than the material music included in the designation information in the music data composed by the external server on the basis of the designation information. The transmission/reception unit transmits the designation information and the information for determining the type and amount of material music other than the material music included in the designation information to the external server. As a result, the information processing device can generate music data having the characteristics that the user desires.

The second application further includes a display control unit (display control unit 169 in embodiment) that performs control to retrieve the history of past music data composed by the external server from the storage unit and display the history of the past music data according to the user's operation. As a result, the information processing device can improve the convenience when the user refers to the past operation history and the like.

The display control unit performs control to retrieve the history of editing operations performed on the past music data composed by the external server from the storage unit, and also display the editing operations performed on the past music data. As a result, the information processing device can improve the convenience when the user refers to the past operation history and the like.

When the user performs a playback or editing operation on the music data composed by the external server after receiving the music data, the transmission/reception unit transmits information regarding the playback or editing operation to the external server. As a result, the information processing device can cause the processing server 100 to perform further learning on the basis of the editing and the like performed by the user.

The selection unit selects, as setting information, a chord progression in the composed music on the basis of the user's operation. The transmission/reception unit transmits the chord progression selected by the selection unit to the external server. As a result, the information processing device can provide music data that the user desires without depending on the designation information.

The control unit performs control to transmit information regarding the chord progression generated in the first application to the second application. The selection unit selects, as setting information, the information regarding the chord progression generated in the first application. The transmission/reception unit transmits the information regarding the chord progression generated in the first application to the external server, and receives music data composed on the basis of the information regarding the chord progression. As a result, the information processing device can perform composition processing utilizing the functions of the first application such as a DAW.

5. Hardware Configuration

Figure 20:
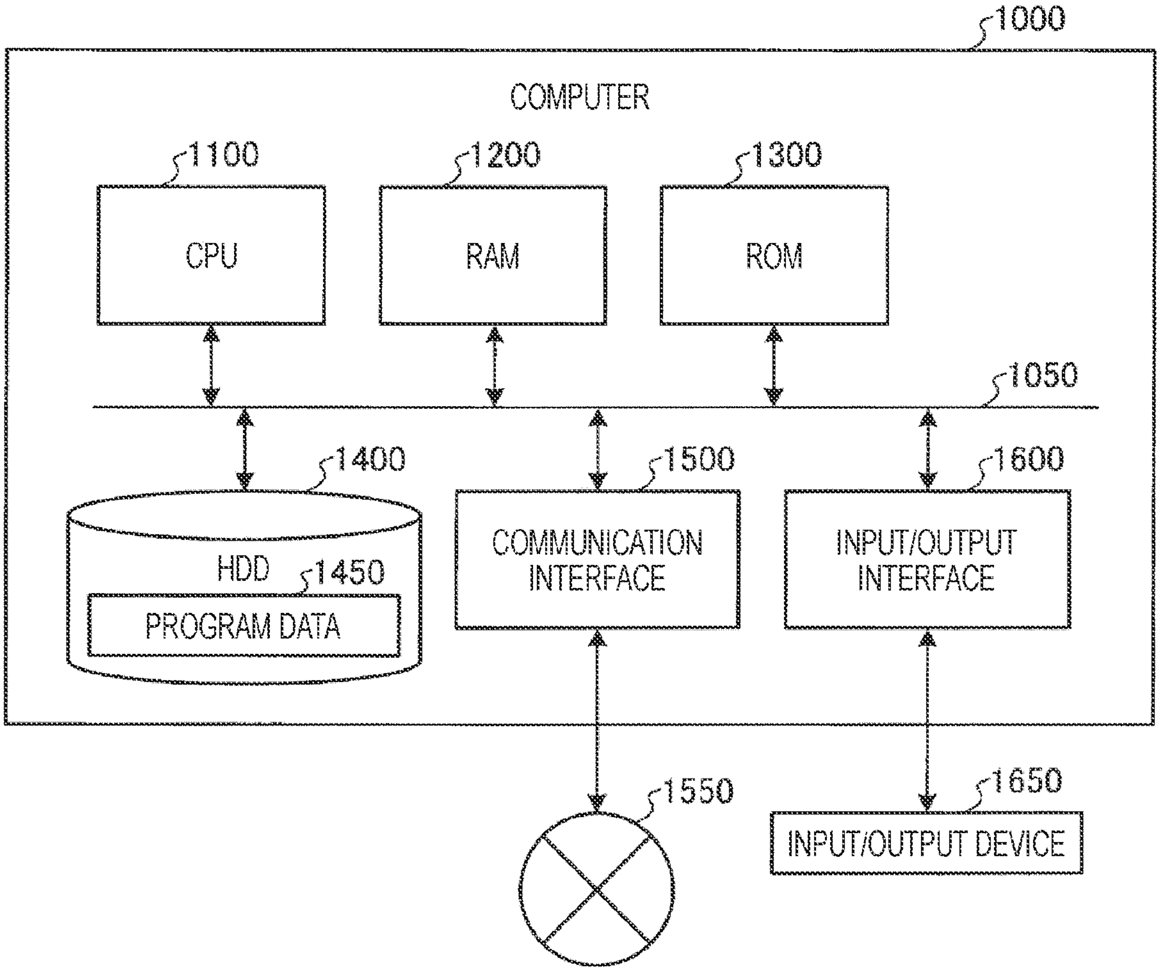
FIG. 20 is a hardware configuration diagram showing one example of a computer that implements functions of an information processing device.

The information devices such as the user terminal 10, the processing server 100, and the management server 200 according to each of the above-described embodiments are implemented by a computer 1000 having a configuration as shown in FIG. 20, for example. Hereinafter, the user terminal 10 according to the embodiment will be described as an example. FIG. 20 is a hardware configuration diagram showing one example of the computer 1000 that implements the functions of the user terminal 10. The computer 1000 has a CPU 1100, a RAM 1200, a read only memory (ROM) 1300, a hard disk drive (HDD) 1400, a communication interface 1500, and an input/output interface 1600. Each part of computer 1000 is connected by a bus 1050.

The CPU 1100 operates on the basis of a program stored in the ROM 1300 or the HDD 1400, and controls each part. For example, the CPU 1100 expands the program stored in the ROM 1300 or the HDD 1400 into the RAM 1200 and executes processing corresponding to various programs.

The ROM 1300 stores a boot program such as the basic input output system (BIOS) executed by the CPU 1100 when the computer 1000 is started, and programs that depend on the hardware of the computer 1000.

The HDD 1400 is a computer-readable recording medium that non-temporarily records programs executed by the CPU 1100 and data used by the programs. Specifically, the HDD 1400 is a recording medium for recording an information processing program according to the present disclosure, which is one example of program data 1450.

The communication interface 1500 is an interface for the computer 1000 to connect to an external network 1550 (e.g., the Internet). For example, the CPU 1100 receives data from another device or transmits data generated by the CPU 1100 to another device through the communication interface 1500.

The input/output interface 1600 is an interface for connecting an input/output device 1650 and the computer 1000. For example, the CPU 1100 receives data from an input device such as a keyboard or a mouse through the input/output interface 1600. Additionally, the CPU 1100 transmits data to an output device such as a display, a speaker, or a printer through the input/output interface 1600. Additionally, the input/output interface 1600 may function as a media interface for reading a program or the like recorded on a predetermined recording medium. The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the user terminal 10 according to the embodiment, the CPU 1100 of the computer 1000 implements the functions of the control unit 16 and the like by executing the information processing program loaded on the RAM 1200. Additionally, the HDD 1400 stores the information processing program according to the present disclosure and the data in the storage unit 15. Note that while the CPU 1100 reads and executes the program data 1450 from the HDD 1400, as another example, these programs may be acquired from another device through the external network 1550.

Note that the present technology can also be configured in the following manner.

(1)

An information processing device that controls a first application and a second application that functions as a plug-in that extends functions of the first application, in which the first application includes a control unit that controls operation of the second application in the first application, and the second application includes a selection unit that selects setting information for controlling a composition function based on machine learning, and a transmission/reception unit that transmits the setting information to an external server that executes a composition function based on machine learning and receives music data composed by the external server through a network.

(2)

The information processing device according to (1) above, in which the transmission/reception unit receives a chord in a bar of a specified length, a melody in the bar, and a bass note in the bar as music data.

(3)

The information processing device according to (2) above, in which the control unit individually sets instrument information for designating a tone quality when playing back the chord, melody, or bass note included in the music data.

(4)

The information processing device according to (3) above, in which the control unit performs control to separately display each window displaying information regarding the chord, melody, or bass note included in the music data.

(5)

The information processing device according to (4) above, in which the control unit controls transmission and reception of information between each window displaying information regarding the chord, melody or bass note and a window displaying information regarding the first application, according to a user's operation.

(6)

The information processing device according to (4) or (5) above, in which the control unit controls transmission and reception of information between windows each displaying information regarding the chord, melody, or bass note, according to the user's operation.

(7)

The information processing device according to any one of (1) to (6) above, in which the selection unit selects, as the setting information, designation information for designating material music to be learning data for the machine learning, and the transmission/reception unit transmits the designation information selected by the selection unit to the external server.

(8)

The information processing device according to (7) above, in which according to a user's operation, the selection unit selects designation information that is stored in a storage unit in advance and includes feature information indicating a feature of the designation information and multiple pieces of material music associated with the feature information.

(9)

The information processing device according to (7) or (8) above, in which the selection unit selects combined designation information in which first designation information corresponding to some bars of music data composed by the external server and second designation information corresponding to some other bars thereof are combined.

(10)

The information processing device according to (9) above, in which when the transmission/reception unit receives music data composed by the external server on the basis of the combined designation information, the transmission/reception unit stores the combined designation information in association with the music data in a storage unit.

(11)

The information processing device according to any one of (7) to (10) above, in which the selection unit selects, as the setting information, length information of notes included in music data composed by the external server on the basis of the designation information, and the transmission/reception unit transmits the designation information and the note length information to the external server.

(12)

The information processing device according to any one of (7) to (11) above, in which the selection unit selects, as the setting information, information for determining the probability that constituent notes included in a chord appear in a melody of music data composed by the external server on the basis of the designation information, and the transmission/reception unit transmits the designation information and the information for determining the probability that constituent notes included in a chord appear in a melody to the external server.

(13)

The information processing device according to any one of (7) to (12) above, in which the selection unit selects, as the setting information, information for determining a type and amount of material music other than material music included in the designation information in music data composed by the external server on the basis of the designation information, and the transmission/reception unit transmits the designation information and the information for determining a type and amount of material music other than material music included in the designation information to the external server.

(14)

The information processing device according to any one of (1) to (13) above, in which the second application further includes a display control unit that performs control to retrieve a history of past music data composed by the external server from a storage unit and display the history of the past music data according to a user's operation.

(15)

The information processing device according to (14) above, in which the display control unit performs control to retrieve a history of editing operations performed on the past music data composed by the external server from a storage unit, and also display the editing operations performed on the past music data.

(16)

The information processing device according to any one of (1) to (15) above, in which when the user performs a playback or editing operation on music data composed by the external server after receiving the music data, the transmission/reception unit transmits information regarding the playback or editing operation to the external server.

(17)

The information processing device according to any one of (1) to (16) above, in which the selection unit selects, as the setting information, a chord progression in composed music on the basis of a user's operation, and the transmission/reception unit transmits the chord progression selected by the selection unit to the external server.

(18)

The information processing device according to any one of (1) to (17) above, in which the control unit performs control to transmit information regarding a chord progression generated in the first application to the second application, the selection unit selects, as the setting information, the information regarding the chord progression generated in the first application, and the transmission/reception unit transmits the information regarding the chord progression generated in the first application to the external server, and receives music data composed on the basis of the information regarding the chord progression.

(19)

An information processing method executed by an information processing device that controls a first application and a second application that functions as a plug-in that extends functions of the first application, in which the first application controls operation of the second application in the first application, and the second application selects setting information for controlling a composition function based on machine learning, and transmits the setting information to an external server that executes a composition function based on machine learning and receives music data composed by the external server through a network.

(20)

An information processing program that causes an information processing device that controls a first application and a second application that functions as a plug-in that extends functions of the first application to function so that the first application controls operation of the second application in the first application, and the second application selects setting information for controlling a composition function based on machine learning, and transmits the setting information to an external server that executes a composition function based on machine learning and receives music data composed by the external server through a network.

REFERENCE SIGNS LIST

1 Information processing system
10 User terminal
11 Communication unit
12 Input unit
13 Display unit
15 Storage unit
151 Composition setting information
152 Composition music information
153 History information
154 Associated instrument information
16 Control unit
161 Host application control unit
162 Plug-in control unit
163 Playback unit
164 Display control unit
165 Plug-in application control unit
166 Selection unit
167 Transmission/reception unit
168 Playback unit
169 Display control unit
100 Processing server
200 Management server

The invention claimed is:

1. An information processing device, comprising:

circuitry configured to:

control a first application and a second application, wherein the second application is a plug-in that extends functions of the first application, the first application includes a first processor configured to control an operation of the second application in the first application, the second application includes a second processor configured to select setting information that controls a composition function, and the composition function is based on machine learning;

transmit the setting information to an external server that executes the composition function based on the machine learning;

receive music data composed by the external server through a network, wherein the composed music data is received in the second application;

control display of the composed music data in a window associated with the second application; and control the first application to copy the composed music data to a window that displays information associated with the first application, wherein the first application includes an editing application to combine the composed music data with a track edited in the first application.

2. The information processing device according to claim 1, wherein the circuitry is further configured to receive a chord in a bar of a specified length, a melody, and a bass note in the bar as the music data.

3. The information processing device according to claim 2, wherein the circuitry is further configured to individually set instrument information for designation of a tone quality for playback of one of the chord, the melody, or the bass note included in the music data.

4. The information processing device according to claim 3, wherein the circuitry is further configured to control display of a plurality of windows, and each window of the plurality of windows is configured to display information regarding one of the chord, the melody, or the bass note included in the music data.

5. The information processing device according to claim 4, wherein the circuitry is further configured to control transmission and reception of information between the plurality of windows that displays the information regarding the chord, the melody and the bass note, and the window that displays the information associated with the first application, according to a user operation.

6. The information processing device according to claim 4, wherein the circuitry is further configured to control transmission and reception of information between the plurality of windows that display the information regarding the chord, the melody, and the bass note, according to a user operation.

7. The information processing device according to claim 1, wherein the second processor is further configured to select, as the setting information, designation information to designate material music as learning data for the machine learning, and the circuitry is further configured to transmit the designation information to the external server.

8. The information processing device according to claim 7, wherein the selection unit-second processor is further configured to select, based on a user operation, the designation information that is stored in a storage unit in advance, and the designation information includes feature information indicating a feature of the designation information and a plurality of pieces of material music associated with the feature information.

9. The information processing device according to claim 7, wherein the second processor is further configured to select combined designation information in which first designation information corresponding to first bars of the music data composed by the external server is combined with second designation information corresponding to second bars of the music data.

10. The information processing device according to claim 9, wherein the circuitry is further configured to:

receive, based on the combined designation information, the music data composed by the external server, and store the combined designation information in association with the music data in a storage unit.

11. The information processing device according to claim 7, wherein the second processor is further configured to select, as the setting information based on the designation information, length information of notes included in the music data composed by the external server, and the circuitry is further configured to transmit the designation information and the length information to the external server.

12. The information processing device according to claim 7, wherein the second processor is further configured to select, as the setting information based on the designation information, information to determine a probability that constituent notes included in a chord appear in a melody of the music data composed by the external server, and the circuitry is further configured to transmit the designation information and the information to determine the probability that the constituent notes included in the chord appear in the melody to the external server.

13. The information processing device according to claim 7, wherein the second processor is further configured to select, as the setting information based on the designation information, information to determine a type and amount of first material music different from second material music included in the designation information in the music data composed by the external server, and the circuitry is further configured to transmit the designation information and the information to determine the type and the amount of the first material music to the external server.

14. The information processing device according to claim 1, wherein the second application is further configured to:

retrieve a history of past music data composed by the external server from a storage unit; and control display of the history of the past music data according to a user operation.

15. The information processing device according to claim 14, wherein the second application is further configured to:

retrieve a history of editing operations performed on the past music data composed by the external server from the storage unit; and control display of the editing operations.

16. The information processing device according to claim 1, wherein in a case where one a playback or an editing operation on the music data composed by the external server is performed after receiving the music data, the circuitry is further configured to transmit information regarding one of the playback or the editing operation to the external server.

17. The information processing device according to claim 1, wherein the second processor is further configured to select, as the setting information, a chord progression based on user operation, and the circuitry is further configured to transmit the chord progression to the external server.

18. The information processing device according to claim 1, wherein the circuitry is further configured to transmit information regarding a chord progression generated in the first application to the second application, the second processor is further configured to select, as the setting information, the information regarding the chord progression generated in the first application, and the circuitry is further configured to:

transmit the information regarding the chord progression generated in the first application to the external server; and receive the music data composed based on the information regarding the chord progression.

19. An information processing method, comprising:

controlling a first application and a second application, wherein the second application is a plug-in that extends functions of the first application, the first application controls an operation of the second application in the first application, the second application selects setting information that controls a composition function, and the composition function is based on machine learning;

transmitting the setting information to an external server that executes the composition function based on the machine learning;

receiving music data composed by the external server through a network, wherein the composed music data is received in the second application;

controlling display of the composed music data in a window associated with the second application; and controlling the first application to copy the composed music data to a window that displays information associated with the first application, wherein the first application includes an editing application to combine the composed music data with a track edited in the first application.

20. A non-transitory computer-readable medium having stored thereon, computer-executable instructions that when executed by an information processing device, causes the information processing device to execute operations, the operations comprising:

controlling a first application and a second application, wherein the second application is a plug-in that extends functions of the first application, the first application controls an operation of the second application in the first application, the second application selects setting information that controls a composition function, and the composition function is based on machine learning;

transmitting the setting information to an external server that executes the composition function based on the machine learning;

receiving music data composed by the external server through a network, wherein the composed music data is received in the second application;

controlling display of the composed music data in a window associated with the second application; and controlling the first application to copy the composed music data to a window that displays information associated with the first application, wherein the first application includes an editing application to combine the composed music data with a track edited in the first application.

* * * * *